United States Patent
Aggarwal et al.

(10) Patent No.: US 12,145,800 B1
(45) Date of Patent: Nov. 19, 2024

(54) STRUCTURED FIELD MAP GENERATION FOR INVENTORY SYSTEM

(71) Applicant: Amazon Technologies, Inc., Seattle, WA (US)

(72) Inventors: Aayush Aggarwal, Medford, MA (US); Vishnu R. Ayyagari, Boxboro, MA (US)

(73) Assignee: Amazon Technologies, Inc., Seattle, WA (US)

(*) Notice: Subject to any disclaimer, the term of this patent is extended or adjusted under 35 U.S.C. 154(b) by 981 days.

(21) Appl. No.: 17/104,914

(22) Filed: Nov. 25, 2020

(51) Int. Cl.
*B65G 1/04* (2006.01)
*B65G 1/16* (2006.01)
*G05D 1/00* (2024.01)

(52) U.S. Cl.
CPC .............. *B65G 1/0492* (2013.01); *B65G 1/16* (2013.01); *G05D 1/0234* (2013.01); *G05D 1/0219* (2013.01)

(58) Field of Classification Search
CPC .................................. B65G 1/0492; B65G 1/16
See application file for complete search history.

(56) References Cited

U.S. PATENT DOCUMENTS

| | | | |
|---|---|---|---|
| 3,705,410 A | * | 12/1972 | Kooy .................. G06Q 10/087 700/214 |
| 9,152,149 B1 | * | 10/2015 | Palamarchuk .......... G06F 16/29 |
| 10,628,790 B1 | | 4/2020 | Aggarwal et al. |
| 2009/0063035 A1 | * | 3/2009 | Mandel .................. G06F 30/18 701/437 |
| 2013/0310971 A1 | * | 11/2013 | Prouty .................. E01C 23/163 901/1 |
| 2018/0060764 A1 | * | 3/2018 | Hance ..................... G06Q 10/08 |
| 2018/0300435 A1 | * | 10/2018 | Eckman ................. G06Q 10/08 |
| 2019/0266552 A1 | * | 8/2019 | Gupta ................. G06Q 30/0201 |
| 2019/0333009 A1 | * | 10/2019 | Zhou .................... G06Q 10/087 |
| 2020/0097898 A1 | * | 3/2020 | Hance ..................... B65G 61/00 |
| 2021/0354922 A1 | * | 11/2021 | Gravelle .............. B65G 1/1378 |
| 2022/0088779 A1 | * | 3/2022 | Lu .......................... B25J 11/008 |
| 2022/0258978 A1 | * | 8/2022 | Fagerland ............ G05D 1/0274 |
| 2022/0384229 A1 | * | 12/2022 | Kitamura ............. G05D 1/0289 |
| 2023/0060858 A1 | * | 3/2023 | Funk ................ G05B 19/41895 |

FOREIGN PATENT DOCUMENTS

| | | | | |
|---|---|---|---|---|
| WO | WO-2015125287 A1 | * | 8/2015 | ............. G06Q 10/04 |
| WO | WO-2021184193 A1 | * | 9/2021 | ........... G06Q 10/043 |

* cited by examiner

*Primary Examiner* — Hunter B Lonsberry
*Assistant Examiner* — Harrison Heflin
(74) *Attorney, Agent, or Firm* — Kilpatrick Townsend & Stockton LLP

(57) ABSTRACT

Aspects described herein include a computer-implemented method of generating a floor plan for use by a plurality of mobile drive units within an inventory system. The method comprises defining a grid according to predefined grid rules, placing inventory station blocks, placing predefined travel blocks, and placing predefined storage blocks. Predefined connection rules specify which faces of the different predefined blocks are permitted to connect. The method further comprises outputting a map representing the floor plan. The map comprises location information for fiducial markers corresponding to the predefined blocks.

20 Claims, 14 Drawing Sheets

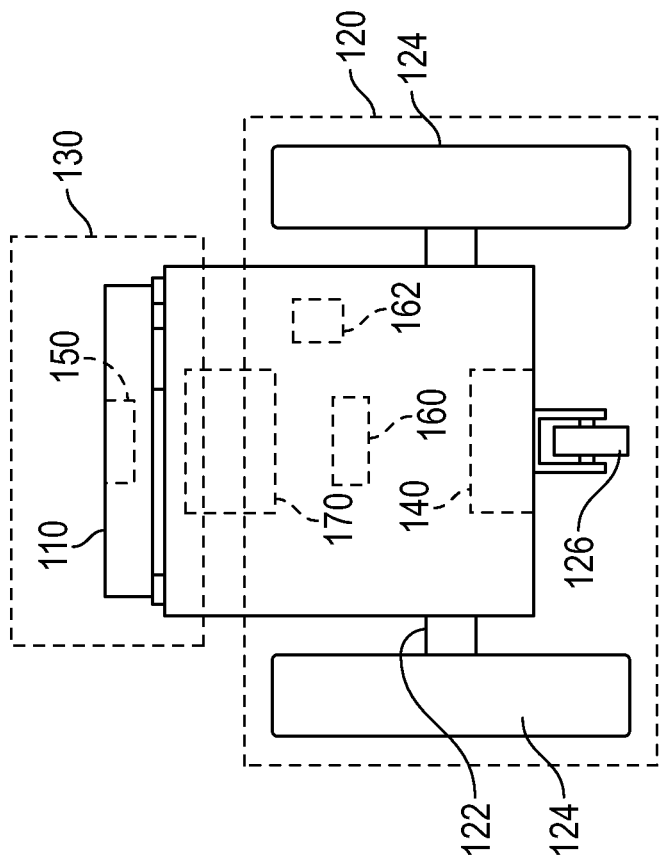
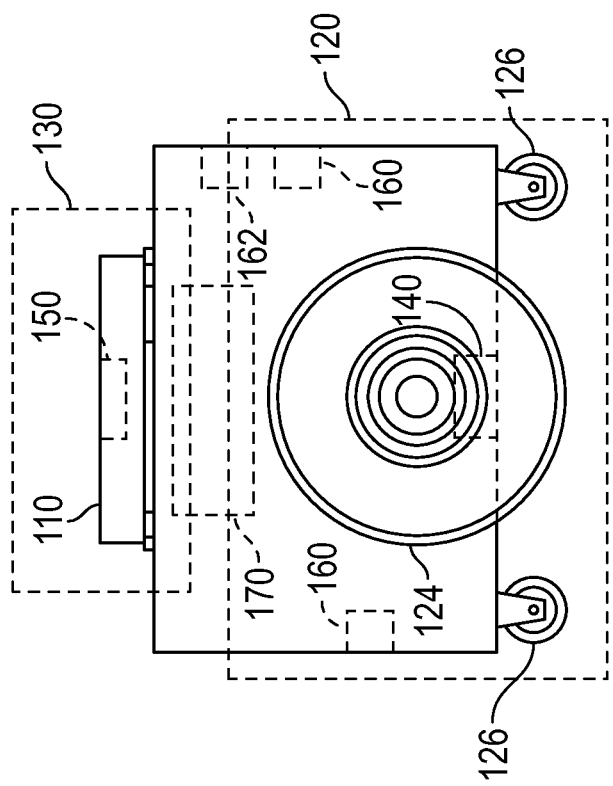
FIG. 2B
FIG. 2A

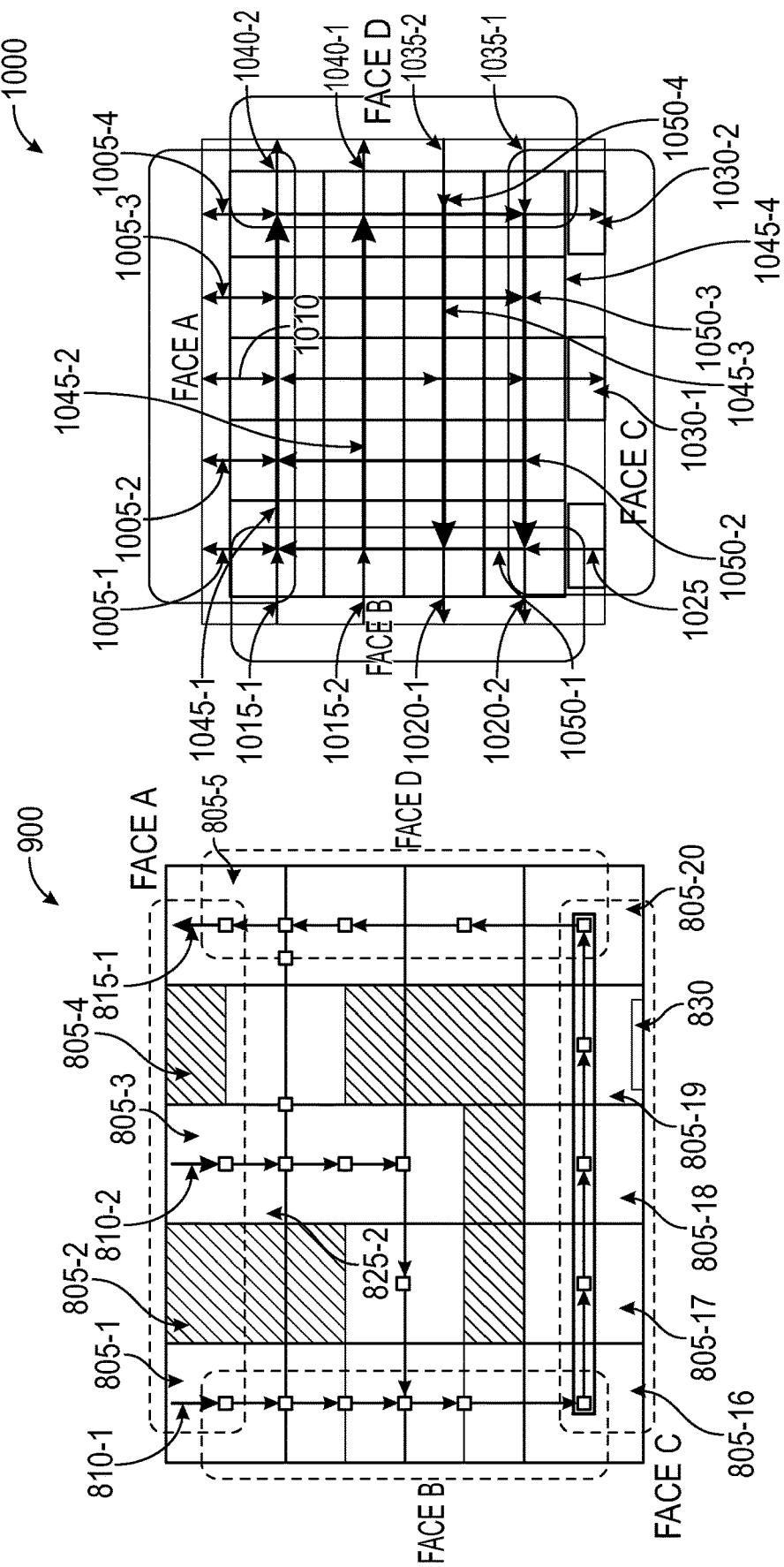

STRUCTURED FIELD MAP GENERATION FOR INVENTORY SYSTEM

BACKGROUND

The present disclosure relates to inventory systems, and more specifically, to techniques for automatically generating structured field maps for use with inventory systems.

BRIEF DESCRIPTION OF DRAWINGS

FIG. 2A is a side view of a mobile drive unit of an inventory system, according to one or more embodiments.

FIG. 2B is a front view of a mobile drive unit of an inventory system, according to one or more embodiments.

FIG. 9 is an alternate implementation of an inventory station block, according to one or more embodiments.

FIG. 10 is an exemplary highway block, according to one or more embodiments.

DETAILED DESCRIPTION

According to one or more embodiments, a computer-implemented method of generating a floor plan is described for use by a plurality of mobile drive units within an inventory system. The method comprises (a) defining a grid for the floor plan according to one or more predefined grid rules, and (b) placing, at respective locations within the grid, one or more predefined inventory station blocks corresponding to one or more inventory stations at which the inventory system is externally accessible. The method further comprises (c) placing, at respective locations within the grid, one or more predefined travel blocks defining one or more dedicated travel paths for the plurality of mobile drive units. One or more predefined connection rules specify one or more faces of the one or more predefined inventory station blocks that are permitted to connect with one or more faces of the one or more predefined travel blocks. Placing the one or more predefined travel blocks comprises specifying, for each travel block of the one or more predefined travel blocks, an orientation of the travel block such that a respective first face of the travel block connects to a respective second face of a respective inventory station block of the one or more predefined inventory station blocks. The method further comprises (d) placing, at respective locations within the grid, one or more predefined storage blocks for storing inventory holders that are selectively movable by the plurality of mobile drive units. The one or more predefined connection rules further specify one or more faces of the one or more predefined inventory station blocks that are permitted to connect with one or more faces of the one or more predefined travel blocks. The method further comprises (e) outputting a map representing the floor plan. The map comprises location information for fiducial markers corresponding to the one or more predefined inventory station blocks, the one or more predefined travel blocks, and the one or more predefined storage blocks.

In this way, the method may automatically generate one or more maps for the structured field using a plurality of predefined blocks and applying a plurality of predefined rules. In some cases, the method generates a plurality of maps and, through simulation, assesses the relative efficiency or effectiveness of the maps. Beneficially, the method provides a substantially improved efficiency when compared with conventional techniques, where human designers use graphical user interface (GUI)-based tools to manually generate structured field maps.

Figure 1:
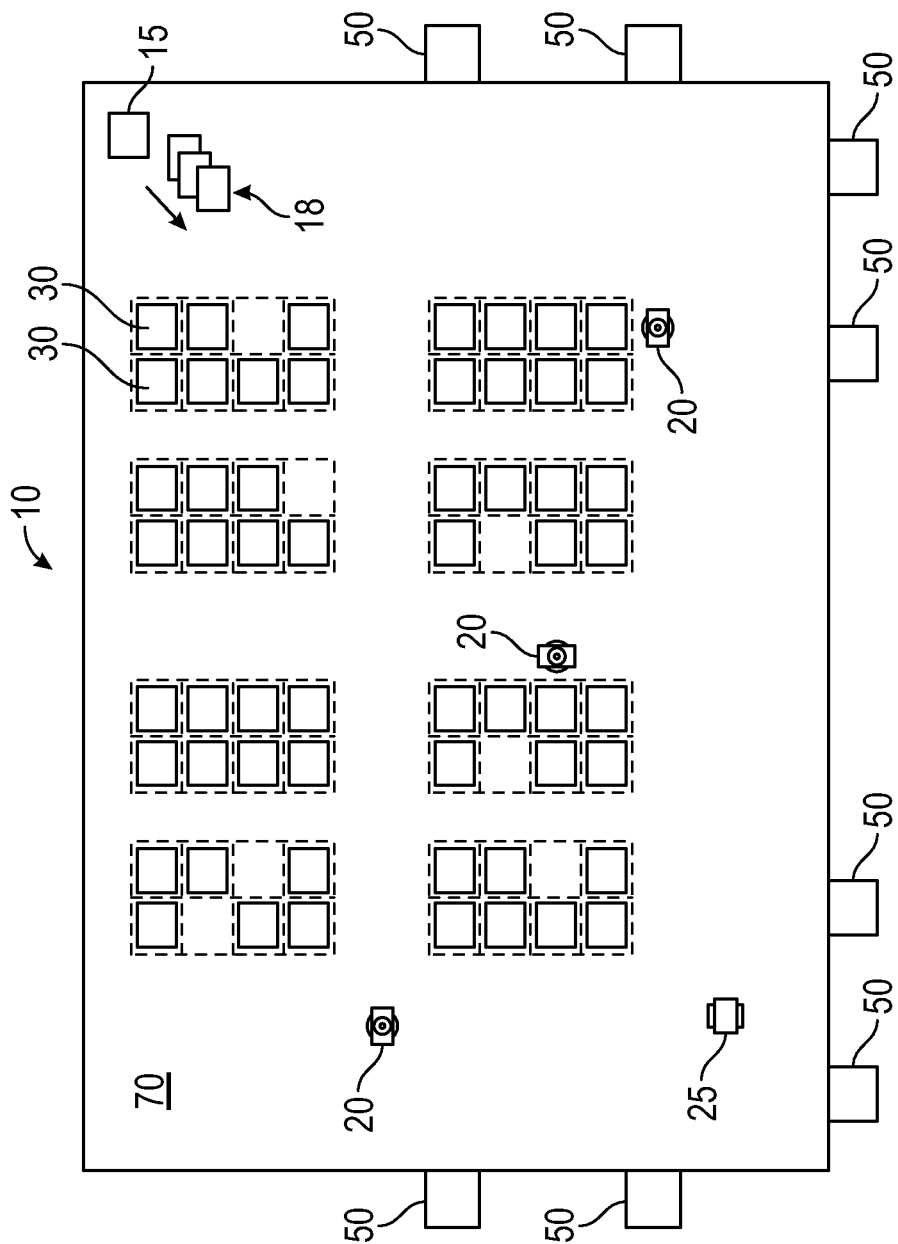
FIG. 1 is a diagram of an inventory system, according to one or more embodiments.

FIG. 1 is a diagram of an inventory system 10, according to one or more embodiments. The inventory system 10 includes a controller 15, one or more mobile drive units 20 (which may be also referred to as "unit(s) 20"), one or more unmanned fiducial marker placement units 25 (which may be also referred to as "unit(s) 25"), one or more inventory holders 30, and one or more inventory stations 50. Each of the one or more mobile drive units 20 transport the inventory holders 30 between points within a workspace 70 in response to commands communicated by the controller 15. Each of the one or more inventory holders 30 stores one or more types of inventory items. The one or more unmanned fiducial marker placement units 25 are operable to place fiducial markers onto the floor of the workspace 70. The fiducial markers are generally used by the inventory system 10 to demarcate different (functional) areas within the workspace 70, as well as provide navigational references for the unmanned fiducial marker placement units 25 and the mobile drive units 20. The inventory system 10 is capable of moving inventory items between locations within the workspace 70 to facilitate the entry, processing, and/or removal of inventory items from the inventory system 10 and the completion of other tasks involving inventory items.

The controller 15 assigns tasks to appropriate components of the inventory system 10 and coordinates operation of the various components in completing the tasks. These tasks may relate not only to the movement and processing of inventory items, but also to the management and maintenance of the components of the inventory system 10. For example, the controller 15 may assign portions of the workspace 70 for "parking" the mobile drive units 20 and the one or more unmanned fiducial marker placement units 25, for recharging and/or replacing batteries of the mobile drive unit 20, the storage of empty inventory holders 30, or any other operations associated with the functionality supported by the inventory system 10 and its various components. The controller 15 may select components of the inventory system 10 to perform these tasks and communicate appropriate commands and/or data to the selected components to facilitate completion of these operations. Although shown in FIG. 1 as a single, discrete component, the controller 15 may represent multiple components and may represent or include portions of the mobile drive units 20, the one or more unmanned fiducial marker placement units 25, and/or other elements of the inventory system 10. As a result, any or all of the interaction(s) between a particular mobile drive unit 20 and the controller 15 and/or between a particular unmanned fiducial marker placement unit 25 and the controller 15 that is described below may, in particular embodiments, represent peer-to-peer communication between the particular mobile drive unit 20, the particular unmanned fiducial marker placement unit 25 and one or more other particular mobile drive units 20 and/or unmanned fiducial marker placement units 25. The contents and operation of an example embodiment of the controller 15 are discussed with reference to FIG. 3 of U.S. Pat. No. 10,628,790, which is herein incorporated by reference.

The mobile drive units 20 move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular embodiment of the inventory system 10, the mobile drive units 20 and the one or more unmanned fiducial marker placement units 25 represent independent, self-powered devices configured to freely move about the workspace 70. In alternative embodiments, the mobile drive units 20 represent elements of a tracked inventory system configured to move the inventory holders 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10, the mobile drive units 20 and/or the one or more unmanned fiducial marker placement units 25 may be configured to use alternative conveyance equipment to move within the workspace 70 and/or between separate portions of the workspace 70. The contents and operation of an example embodiment of the mobile drive units 20 are discussed further below with respect to FIGS. 2A and 2B. The contents and operation of an example embodiment of the unmanned fiducial marker placement unit 25 are discussed further below with respect to FIGS. 3A and 3B.

Additionally, the mobile drive units 20 may be capable of communicating with the controller 15 to receive information identifying selected inventory holders 30, transmit the locations of the mobile drive units 20, and/or exchange any other suitable information to be used by the controller 15 or the mobile drive units 20 during operation. The one or more unmanned fiducial marker placement units 25 may be capable of communicating with the controller 15 to receive information identifying the location and orientation for placement of fiducial markers, transmit image data for images of fiducial markers captured by the unmanned fiducial marker placement unit 25 for processing by the controller 15, to receive data indicating the position and orientation of the unmanned fiducial marker placement unit 25 determined via processing of the image data, to transmit data indicating placement of one or more fiducial markers onto the floor of the inventory system 10, or exchange any other suitable information to be used by the controller 15 or the unmanned fiducial marker placement unit 25 during operation. The mobile drive units 20 and/or the unmanned fiducial marker placement units 25 may communicate with the controller 15 wirelessly, using wired connections between the mobile drive units 20 and/or the unmanned fiducial marker placement units 25 and the controller 15, and/or in any other appropriate manner. As one example, particular embodiments of the mobile drive units 20 and/or the unmanned fiducial marker placement units 25 may communicate with the controller 15 and/or with one another using IEEE 802.11, Bluetooth, or Infrared Data Association (IrDA) standards, or any other appropriate wireless communication protocol. As another example, in a tracked implementation of the inventory system 10, tracks or other guidance elements upon which the mobile drive units 20 move may be wired to facilitate communication between the mobile drive units 20 and other components of the inventory system 10. Furthermore, as noted above, the controller 15 may include components of the individual mobile drive units 20 and/or the unmanned fiducial marker placement units 25. Thus, for the purposes of this description and the claims that follow, communication between the controller 15 and a particular mobile drive unit 20 and/or a particular unmanned fiducial marker placement unit 25 may represent communication between components of the particular mobile drive unit 20 and/or the particular unmanned fiducial marker placement unit 25. In general, the mobile drive units 20 and/or the unmanned fiducial marker placement units 25 may be powered, propelled, and controlled in any manner appropriate based on the configuration and characteristics of the inventory system 10.

Each of the inventory holders 30 store inventory items of the inventory system 10. In a particular embodiment, the inventory holders 30 include multiple storage bins with each storage bin capable of holding one or more types of inventory items. The inventory holders 30 are capable of being carried, rolled, and/or otherwise moved by the mobile drive units 20. In particular embodiments, the inventory holders 30 may provide additional propulsion to supplement the propulsion provided by the mobile drive unit 20 when moving one of the inventory holders 30.

Additionally, in particular embodiments, the inventory items may also be suspended from hooks or bars (not shown) within or on the inventory holders 30. In general, the inventory holders 30 may store inventory items in any appropriate manner within the inventory holders 30 and/or on the external surface of the inventory holders 30.

Additionally, each of the inventory holders 30 may include a plurality of faces, and each storage bin may be accessible through one or more faces of the inventory holders 30. For example, in a particular embodiment, each of the inventory holders 30 includes four faces. In such an embodiment, storage bins located at a corner of two faces may be accessible through either of those two faces, while each of the other storage bins is accessible through an opening in one of the four faces. The mobile drive units 20 may be configured to rotate the inventory holders 30 at appropriate times to present a particular face and the storage bins associated with that face to an operator or to other components of the inventory system 10.

The inventory items represent any objects suitable for storage, retrieval, and/or processing in the automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail-order warehouse facility, and inventory items may represent merchandise stored in the mail-order warehouse facility. During operation, the mobile drive units 20 may retrieve the inventory holders 30 containing one or more inventory items that are requested in an order to be packed for delivery to a customer, or to inventory holders 30 carrying pallets containing aggregated collections of inventory items for shipment. Moreover, in particular embodiments of the inventory system 10, boxes containing completed orders may themselves represent inventory items.

The inventory system 10 may also include one or more inventory stations 50. In some embodiments, each of the one or more inventory stations 50 represents a location at which the inventory system 10 is externally accessible by human operator(s) and/or robotic system(s) external to the inventory system 10. For example, the workspace 70 may be externally bounded by walls or a fence to prevent or limit access to the workspace 70 by human operators, and each of the inventory stations 50 is arranged at an opening in the walls or fence. In other examples, the workspace 70 need not be externally bounded.

The inventory stations 50 represent locations designated for the completion of particular tasks involving inventory items. Such tasks may include the removal of inventory items from the inventory holders 30, the introduction of inventory items into the inventory holders 30, the counting of inventory items in the inventory holders 30, the decomposition of inventory items (e.g., separating from pallet-sized or case-sized groups into individual inventory items), the consolidation of inventory items between the inventory holders 30, and/or the processing or handling of inventory items in any other suitable manner. In particular embodiments, the inventory stations 50 may just represent the physical locations where particular task(s) involving inventory items can be completed within the workspace 70. In alternate embodiments, the inventory stations 50 may represent both the physical location and also any appropriate equipment for processing or handling inventory items, such as scanners for monitoring the flow of inventory items in and out of the inventory system 10, communication interfaces for communicating with the controller 15, and/or any other suitable components. The inventory stations 50 may be controlled, entirely or in part, by human operator(s) or may be fully automated. Moreover, the human or automated operator(s) of the inventory stations 50 may be capable of performing certain tasks to inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 1 shows, for the purposes of illustration, an embodiment of the inventory system 10 in which the workspace 70 includes a fixed, predetermined, and finite physical space, particular embodiments of the inventory system 10 may include mobile drive units 20 and inventory holders 30 that are configured to operate within a workspace 70 that is of variable dimensions and/or of an arbitrary geometry. While FIG. 1 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, the controller 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the unmanned fiducial marker placement units 25, the inventory holders 30, the inventory stations 50, and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the controller 15 generates the task assignments 18 based, in part, on inventory requests that the controller 15 receives from other components of the inventory system 10 and/or from external components in communication with the controller 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for packaging and shipment to the customer. The controller 15 may also generate task assignments 18 independently of such inventory requests, as part of the overall management and maintenance of the inventory system 10. For example, the controller 15 may generate task assignments 18 in response to the occurrence of a particular event (e.g., in response to a unit 20, 25 requesting a space to park, a revision of the workspace 70 including installation and/or removal of fiducial markers onto a portion of the revised workspace 70), according to a predetermined schedule (e.g., as part of a daily start-up routine), or at any appropriate time based on the configuration and characteristics of the inventory system 10. After generating one or more task assignments 18, the controller 15 transmits the generated task assignments 18 to appropriate components for completion of the corresponding task. The relevant components then execute their assigned tasks.

With respect to the mobile drive unit(s) 20 and/or the unmanned fiducial marker placement unit(s) 25 specifically, the controller 15 may, in particular embodiments, communicate task assignments 18 to selected mobile drive unit(s) 20 or selected unmanned fiducial marker placement unit(s) 25 that identify one or more destinations for the selected mobile drive unit(s) 20 or the selected unmanned fiducial marker placement unit(s) 25. The controller 15 may select a mobile drive unit 20 or an unmanned fiducial marker placement unit 25 to assign the relevant task based on the location or state of the selected unit 20, 25, an indication that the selected unit 20, 25 has completed a previously-assigned task, a predetermined schedule, and/or any other suitable consideration. These destinations may be associated with an inventory request that the controller 15 is executing or a management objective that the controller 15 is attempting to fulfill. For example, the task assignment may define the location of an inventory holder 30 to be retrieved, an inventory station 50 to be visited, a storage location where the unit 20, 25 should park until receiving another task, the position(s) and orientation(s) for a fiducial marker(s) to be placed by a selected unmanned fiducial marker placement unit 25, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to a particular unit 20, 25, and/or any other appropriate considerations.

As part of completing these tasks, the mobile drive units 20 may dock with and transport inventory holders 30 within the workspace 70. The mobile drive units 20 may dock with inventory holders 30 by connecting to, lifting, and/or otherwise interacting with the inventory holders 30 in any other suitable manner so that, when docked, the mobile drive unit 20 is coupled to and/or supports the inventory holder 30 and can move the inventory holder 30 within the workspace 70. While the description below focuses on particular embodiments of the mobile drive unit 20 and the inventory holder 30 that are configured to dock in a particular manner, alternative embodiments of the mobile drive unit 20 and the inventory holder 30 may be configured to dock in any manner suitable to allow the mobile drive unit 20 to move an inventory holder 30 within the workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the controller 15 may interact with relevant components of the inventory system 10 to ensure the efficient use of space, equipment, manpower, and other resources available to the inventory system 10. As one specific example of such interaction, the controller 15 is responsible, in particular embodiments, for planning the paths that the mobile drive units 20 and/or the unmanned fiducial marker placement unit(s) 25 take when moving within the workspace 70 and for allocating use of a particular portion of the workspace 70 to a particular unit 20, 25 for purposes of completing an assigned task. In such embodiments, the units 20, 25 may, in response to being assigned a task, request a path to a particular destination associated with the task. Moreover, while the description below focuses on one or more embodiments in which the unit 20, 25 requests paths from the controller 15, the unit 20, 25 may, in alternative embodiments, generate its own paths to complete an assigned task.

Components of the inventory system 10 may provide information to the controller 15 regarding their current state, other components of the inventory system 10 with which they are interacting, and/or other conditions relevant to the operation of the inventory system 10. This may allow the controller 15 to utilize feedback from the relevant components to update algorithm parameters, adjust policies, or otherwise modify its decision-making to respond to changes in operating conditions or the occurrence of particular events.

In addition, while the controller 15 may be configured to manage various aspects of the operation of the components of the inventory system 10, in particular embodiments, the components themselves may also be responsible for decision-making relating to certain aspects of their operation, thereby reducing the processing load on the controller 15.

Thus, based on its knowledge of the location, current state, and/or other characteristics of the various components of the inventory system 10 and an awareness of all the tasks currently being completed, the controller 15 can generate task assignments 18, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the controller 15 may, by implementing one or more management techniques described below, enhance the efficiency of the inventory system 10 and/or provide other operational benefits.

FIGS. 2A and 2B illustrate in greater detail the components of a particular embodiment of the mobile drive unit 20 depicted in FIG. 1. In particular, FIGS. 2A and 2B include a side view and a front view of an example mobile drive unit 20. The example mobile drive unit 20 includes a docking head 110, a drive module 120, a docking actuator 130, and a control module 170. Additionally, the mobile drive unit 20 may include one or more sensors configured to generate an output that can be processed to detect or determine the location and orientation of the mobile drive unit 20, the inventory holder 30, and/or other appropriate elements of the inventory system 10. In the illustrated embodiment, the mobile drive unit 20 includes a position sensor 140, a holder sensor 150, an obstacle sensor 160, and an identification signal transmitter 162.

In particular embodiments of the mobile drive unit 20, the docking head 110 couples the mobile drive unit 20 to an inventory holder 30 and/or supports the inventory holder 30 when the mobile drive unit 20 is docked to the inventory holder 30. The docking head 110 may additionally allow the mobile drive unit 20 to maneuver the inventory holder 30, such as by lifting the inventory holder 30, propelling the inventory holder 30, rotating the inventory holder 30, and/or moving the inventory holder 30 in any other appropriate manner. The docking head 110 may also include any appropriate combination of components, such as ribs, spikes, and/or corrugations, to facilitate such manipulation of the inventory holder 30. For example, in particular embodiments, the docking head 110 may include a high-friction portion that abuts a portion of the inventory holder 30 while the mobile drive unit 20 is docked to the inventory holder 30. In such embodiments, frictional forces created between the high-friction portion of the docking head 110 and a surface of the inventory holder 30 may induce translational and rotational movement in the inventory holder 30 when the docking head 110 moves and rotates, respectively. As a result, the mobile drive unit 20 may be able to manipulate the inventory holder 30 by moving or rotating the docking head 110, either independently or as a part of the movement of the mobile drive unit 20 as a whole.

Figure 3B:
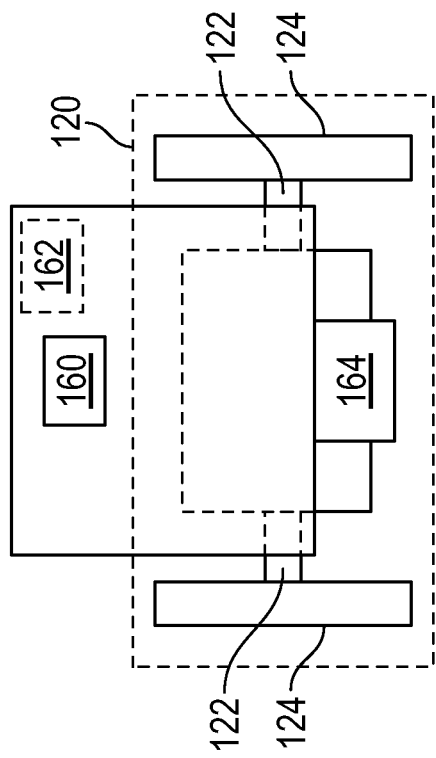
FIG. 3B is a front view of an unmanned fiducial marker application unit of an inventory system, according to one or more embodiments.
Figure 3A:
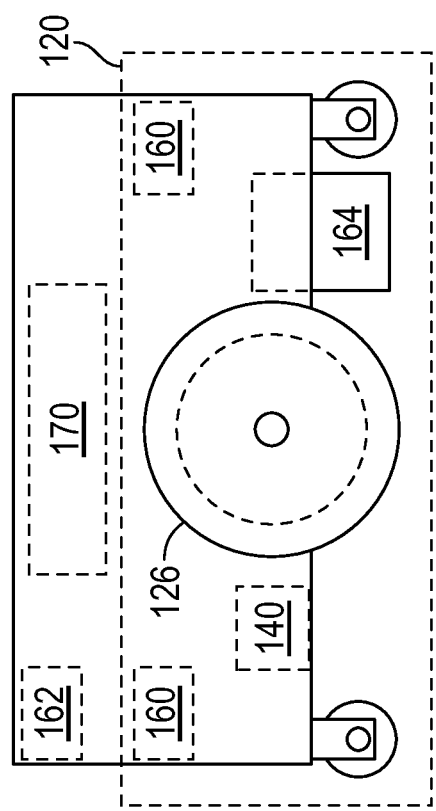
FIG. 3A is a side view of an unmanned fiducial marker application unit of an inventory system, according to one or more embodiments.

The mobile drive unit 20 (as well as the unmanned fiducial marker placement unit 25 depicted in FIGS. 3A, 3B) includes a drive module 120. The drive module 120 propels the mobile drive unit 20 and, when the mobile drive unit 20 and the inventory holder 30 are docked, the inventory holder 30. The drive module 120 may represent any appropriate collection of components operable to propel the drive module 120. For example, in the illustrated embodiment, the drive module 120 includes a pair of motorized axles 122, a pair of motorized wheels 124, and a pair of stabilizing wheels 126. One motorized wheel 124 is mounted to an end of a respective one of the motorized axles 122, and one stabilizing wheel 126 is positioned at each end of the mobile drive unit 20.

The docking actuator 130 moves the docking head 110 towards the inventory holder 30 to facilitate docking of the mobile drive unit 20 and the inventory holder 30. The docking actuator 130 may also be capable of adjusting the position or orientation of the docking head 110 in other suitable manners to facilitate docking. The docking actuator 130 may include any appropriate components, based on the configuration of the mobile drive unit 20 and the inventory holder 30, for moving the docking head 110 or otherwise adjusting the position or orientation of the docking head 110. For example, in the illustrated embodiment, the docking actuator 130 includes a motorized shaft (not shown) attached to the center of the docking head 110. The motorized shaft is operable to lift the docking head 110 as appropriate for docking with the inventory holder 30.

The drive module 120 may be configured to propel the respective mobile drive unit 20 in any suitable manner. For example, in the illustrated embodiments, the motorized wheels 124 are operable to rotate in a first direction to propel the unit 20 in a forward direction. The motorized wheels 124 are also operable to rotate in a second direction to propel the unit 20 in a backward direction. In the illustrated embodiment, the drive module 120 is also configured to rotate the unit 20 by rotating the motorized wheels 124 in different directions from one another or by rotating one of the motorized wheels 124 at a different speed from the other.

The position sensor 140 represents one or more sensors, detectors, or other components suitable for determining the location of the unit 20 in any appropriate manner. For example, in particular embodiments, the workspace 70 associated with the inventory system 10 includes a number of fiducial markers distributed to cover all or a portion of the workspace 70. In such embodiments, the position sensor 140 may include a camera and suitable image-processing and/or video-processing components, such as an appropriately-programmed digital signal processor, to allow the position sensor 140 to detect fiducial markers within the camera's field of view. The control module 170 may store location information that is updated repeatedly to reflect the position and orientation of the unit 20 as determined via processing an image captured by the position sensor 140 encompassing one or more of the fiducial markers. As a result, the control module 170 can maintain an accurate indication of the location and orientation of the unit 20 to aid in navigation when moving the unit 20 within the workspace 70.

The holder sensor 150 represents one or more sensors, detectors, or other components suitable for detecting an inventory holder 30 and/or determining, in any appropriate manner, the location of an inventory holder 30, as an absolute location or as a position relative to the mobile drive unit 20. The holder sensor 150 may be capable of detecting the location of a particular portion of an inventory holder 30 or an inventory holder 30 as a whole. The mobile drive unit 20 may then use the detected information for docking with or otherwise interacting with an inventory holder 30.

The obstacle sensor 160 represents one or more sensors capable of detecting objects located in one or more different directions in which the unit 20 is capable of moving. The obstacle sensor 160 may utilize any appropriate components and techniques, including optical, radar, sonar, pressure-sensing and/or other types of detection devices appropriate to detect objects located in the direction of travel of the unit 20. In particular embodiments, the obstacle sensor 160 may transmit information describing objects it detects to the control module 170 to be used by the control module 170 to identify obstacles and to take appropriate remedial actions to prevent the unit 20 from colliding with obstacles and/or other objects.

The obstacle sensor 160 may also detect signals transmitted by other units 20 operating in the vicinity of the unit 20. For example, in particular embodiments of the inventory system 10, one or more of the units 20 may include an identification signal transmitter 162 that transmits a unit identification signal. The unit identification signal indicates to other units 20 that the object transmitting the unit identification signal is in fact a unit 20. The identification signal transmitter 162 may be capable of transmitting infrared, ultraviolet, audio, visible light, radio, and/or other suitable signals that indicate to recipients that the transmitting device is a unit 20.

Additionally, in particular embodiments, the obstacle sensor 160 may also be capable of detecting state information transmitted by other units 20. For example, in particular embodiments, the identification signal transmitter 162 may be capable of including state information relating to the unit 20 in the transmitted identification signal. This state information may include, but is not limited to, the position, velocity, direction, and the braking capabilities of the transmitting unit 20. In particular embodiments, the unit 20 may use the state information transmitted by other units 20 to avoid collisions when operating in close proximity with those other units 20.

The control module 170 monitors and/or controls operation of the drive module 120 in the unit 20 and the docking actuator 130 in the unit 20. The control module 170 may also receive information from sensors such as position sensor 140 in the unit 20 and the holder sensor 150 in the unit 20 and adjust the operation of the drive module 120 in the unit 20, the docking actuator 130 in the unit 20, and/or other components of the unit 20 based on this information. Additionally, in particular embodiments, the unit 20 may be configured to communicate with a management device of the inventory system 10 and the control module 170 may receive commands transmitted to the unit 20 and communicate information back to the management device utilizing appropriate communication components of the unit 20. The control module 170 may include any appropriate hardware and/or software suitable to provide the described functionality. In particular embodiments, the control module 170 includes a general-purpose microprocessor programmed to provide the described functionality.

Additionally, the control module 170 may include all or portions of the docking actuator 130, the drive module 120, the position sensor 140, and/or the holder sensor 150, and/or share components with any of these elements of the unit 20.

Moreover, in particular embodiments, the control module 170 may include hardware and software located in components that are physically distinct from the device that houses the drive module 120, the docking actuator 130, and/or the other components of the unit 20 described above. For example, in particular embodiments, each unit 20 operating in the inventory system 10 may be associated with a software process (referred to here as a "drive agent") operating on a server that is in communication with the device that houses the drive module 120, the docking actuator 130, and other appropriate components of the unit 20. This drive agent may be responsible for requesting and receiving tasks, requesting and receiving routes, transmitting state information associated with the unit 20, and/or otherwise interacting with the controller 15 and other components of the inventory system 10 on behalf of the device that physically houses the drive module 120, the docking actuator 130, and the other appropriate components of the unit 20. As a result, for the purposes of this description and the claims that follow, the term "mobile drive unit" and/or "unmanned fiducial marker placement unit" can further indicate software and/or hardware, such as agent processes, that provides the described functionality on behalf of the unit 20 but that may be located in physically distinct devices from the drive module 120, the docking actuator 130, and/or the other components of the unit 20 described above.

While FIGS. 2A and 2B illustrate a particular embodiment of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

FIGS. 3A and 3B illustrate an example unmanned fiducial marker placement unit 25 configured for automated application of fiducial markers to a floor of an inventory facility such as an order fulfillment facility, in accordance with some embodiments. In particular, FIGS. 3A and 3B include a front view and a side view of the example fiducial marker placement unit 25. The unmanned fiducial marker placement unit 25 includes functionality similar to the mobile drive unit 20 and may include common and/or similar components. For example, the unmanned fiducial marker placement unit 25 includes the drive module 120 and the control module 170. Additionally, the unmanned fiducial marker placement unit 25 may include one or more sensors configured to generate an output that can be processed to determine the location and orientation of the unmanned fiducial marker placement unit 25 within the inventory facility. In the illustrated embodiment, the unmanned fiducial marker placement unit 25 includes the position sensor 140, the obstacle sensor 160, the identification signal transmitter 162, and an unmanned fiducial marker application assembly 164.

The fiducial marker application assembly 164 is operable to apply fiducial markers to the floor of the inventory facility. The fiducial markers may be implemented in any suitable form that is detectable by the position sensor 140 of unmanned fiducial marker placement units 25 (or mobile drive units 20 depicted in FIGS. 2A, 2B).

In some embodiments, the fiducial marker application assembly 164 is configured to hold a unit of fiducial markers (e.g., a roll or a stack) and operable to press, roll, or stamp each of the fiducial markers in the unit onto the floor of the inventory facility with a designated position and orientation. In some alternate embodiments, a mobile drive unit 20 may include the fiducial marker application assembly 164.

Figure 4:
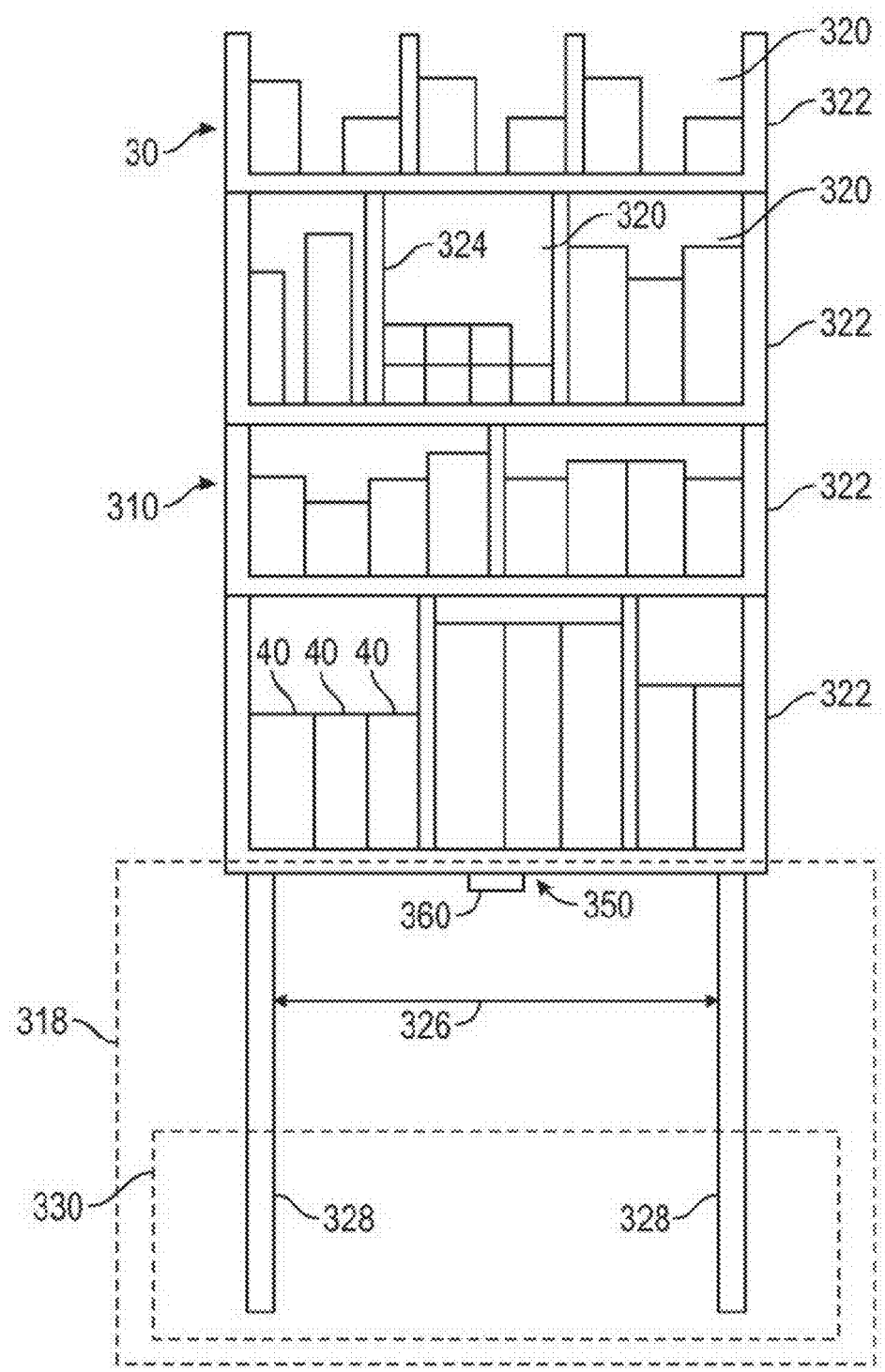
FIG. 4 illustrates the structure and contents of one side of an example inventory holder, according to one or more embodiments.

FIG. 4 illustrates in greater detail the components of a particular embodiment of the inventory holder 30. In particular, FIG. 4 illustrates the structure and contents of one side of an example inventory holder 30. In a particular embodiment, the inventory holder 30 may comprise any number of faces with similar or different structure. As illustrated, the inventory holder 30 includes a frame 310, a plurality of legs 328, and a docking surface 350.

The frame 310 holds a plurality of inventory items 40. The frame 310 provides storage space for storing the inventory items 40 external or internal to the frame 310. The storage space provided by the frame 310 may be divided into a plurality of inventory bins 320, each capable of holding one or more of the inventory items 40. The inventory bins 320 may include any appropriate storage elements, such as bins, compartments, or hooks.

In a particular embodiment, the frame 310 is composed of a plurality of trays 322 stacked upon one another and attached to or stacked on a base 318. In such an embodiment, the inventory bins 320 may be formed by a plurality of adjustable dividers 324 that may be moved to resize one or more of the inventory bins 320. In alternative embodiments, the frame 310 may represent a single inventory bin 320 that includes a single tray 322 and no adjustable dividers 324. Additionally, in particular embodiments, the frame 310 may represent a load-bearing surface mounted on a mobility element 330. The inventory items 40 may be stored on such an inventory holder 30 by being placed on the frame 310. In general, the frame 310 may include internal and/or external storage space that is divided into any appropriate number of the inventory bins 320 in any appropriate manner.

Additionally, in a particular embodiment, the frame 310 may include a plurality of device openings 326 that allow the mobile drive unit 20 to position the docking head 110 adjacent to the docking surface 350. The size, shape, and placement of the device openings 326 may be determined based on the size, the shape, and other characteristics of the particular embodiment of the mobile drive unit 20 and/or the inventory holder 30 utilized by the inventory system 10. For example, in the illustrated embodiment, the frame 310 includes four legs 328 that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the docking head 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in particular embodiments, the docking surface 350 may comprise a high-friction portion. When the mobile drive unit 20 and the inventory holder 30 are docked, frictional forces induced between the docking head 110 and the high-friction portion may allow the mobile drive unit 20 to maneuver the inventory holder 30. Additionally, in particular embodiments, the docking surface 350 may include appropriate components suitable to receive a portion of the docking head 110, couple the inventory holder 30 to the mobile drive unit 20, and/or facilitate control of the inventory holder 30 by the mobile drive unit 20.

A holder identifier 360 marks a predetermined portion of the inventory holder 30 and the mobile drive unit 20 may use the holder identifier 360 to align with the inventory holder 30 during docking and/or to determine the location of the inventory holder 30. More specifically, in particular embodiments, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in particular embodiments, the holder identifier 360 may represent a reflective marker that is positioned at a predetermined location on the inventory holder 30 and that the holder sensor 150 can optically detect using an suitably-configured camera.

Depending on the configuration and characteristics of the mobile drive unit 20 and the inventory system 10, the mobile drive unit 20 may move the inventory holder 30 using a variety of appropriate methods. In a particular embodiment, the mobile drive unit 20 is capable of moving the inventory holder 30 along a two-dimensional grid, combining movement along straight-line segments with ninety-degree rotations and arcing paths to transport the inventory holder 30 from a first location to a second location. Additionally, while moving, the mobile drive unit 20 may use fixed objects located in the workspace as reference points to assist in navigation. For example, in particular embodiments, the inventory system 10 includes multiple fiducial markers. The mobile drive unit 20 may be configured to detect the fiducial markers and to determine the location of the mobile drive unit 20 and/or measure its movement based on the detection of the fiducial markers.

After the mobile drive unit 20 arrives at the second location, the mobile drive unit 20 may perform appropriate operations to facilitate access to the inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from the inventory holder 30 at this new location.

Figure 5:
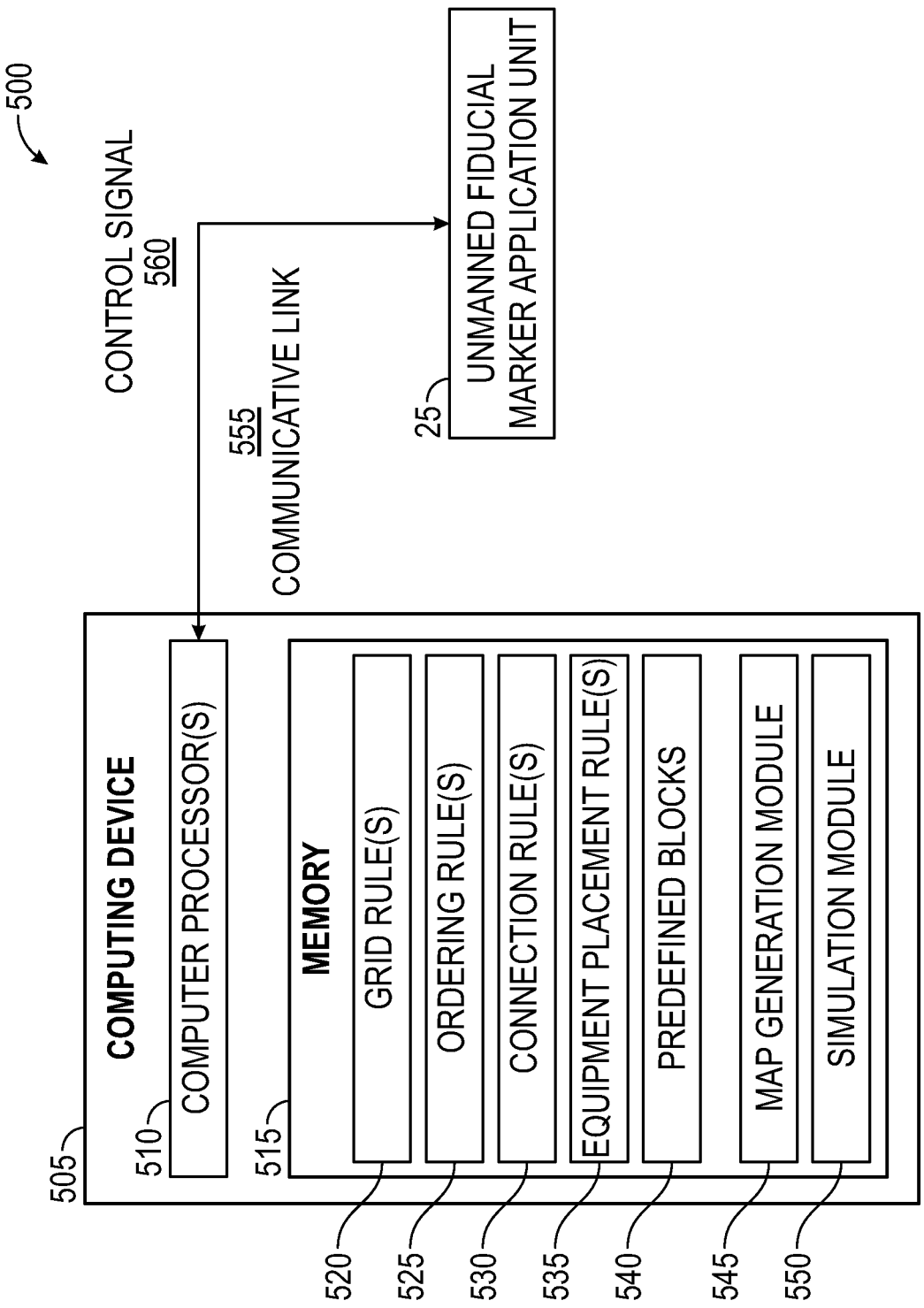
FIG. 5 is a block diagram of a system of generating a floor plan for use by a plurality of mobile drive units within an inventory system, according to one or more embodiments.

FIG. 5 is a block diagram of a system 500 of generating a floor plan for use by a plurality of mobile drive units within an inventory system, according to one or more embodiments. The features illustrated in the system 500 may be used in conjunction with other embodiments. For example, the system 500 may control the unmanned fiducial marker application unit 25 to apply fiducial markers to a floor of an inventory facility.

The system 500 comprises a computing device 505 having one or more computer processors 510 and a memory 515. The computing device 505 is connected with the unmanned fiducial marker application unit 25 via a communicative link 555. Although not shown, the computing device 505 may also be connected with a network via the communicative link 555 or via another communicative link. The network represents one or more networks of any suitable types, such as the Internet, a local area network (LAN), a wide area network (WAN), and/or a wireless network. The communicative link 555 may have any suitable implementation, such as copper transmission cable(s), optical transmission fiber(s), wireless transmission, router(s), firewall(s), switch(es), gateway computer(s), and/or edge server(s).

The one or more computer processors 510 may be implemented in any suitable form, such as a general purpose microprocessor, a controller, an application-specific integrated circuit (ASIC), and so forth. The memory 515 may include a variety of computer-readable media selected for their size, relative performance, or other capabilities: volatile and/or non-volatile media, removable and/or non-removable media, etc.

The memory 515 may include one or more modules for performing various functions described herein. In one embodiment, each module includes program code that is executable by the one or more computer processors 510. In another embodiment, each module is partially or fully implemented in hardware (i.e., circuitry) or firmware of the computing device 505 (e.g., as circuitry within the one or more computer processors 510). However, other embodiments of the system 500 may include modules that are partially or fully implemented in other hardware or firmware, such as hardware or firmware included in one or more other computing devices connected with the network, and so forth. Stated another way, the overall functionality of the one or more modules may be distributed among other devices of the system 500.

As shown, the memory 515 comprises a map generation module 545 and a simulation module 550. The map generation module 545 generates maps for a structured field by placing a plurality of predefined blocks 540 in accordance with a plurality of different rules. In some embodiments, the structured field corresponds to a layout for an inventory system (e.g., a floor plan for use by a plurality of mobile drive units), although other environments and contexts are also contemplated. For example, the map generation module 545 may generate maps for an office space environment, for a commercial environment, and so forth. In some embodiments, the structured field may be a two-dimensional representation (e.g., area), such as a floor plan. In other embodiments, the structured field may be a three-dimensional representation (e.g., volume).

The map generation module 545 generates the maps for the structured field using the plurality of predefined blocks 540 and using a plurality of predefined rules stored in the memory 515. In some embodiments, the plurality of predefined blocks 540 comprise different types of blocks. The different types may correspond to different functions of the inventory system. Although the plurality of predefined blocks 540 are discussed primarily in terms of inventory station blocks, travel blocks, storage blocks, and charger blocks, other functions and combinations of functions are also contemplated. For example, using the example of an office space environment, the blocks may include individual workspace blocks (e.g., cubicles or offices), group workspace blocks (e.g., conference rooms), travel blocks (e.g., walkways), common area blocks (e.g., lobbies or kitchens), storage blocks (e.g., physical file storage, computing equipment storage), and so forth.

As will be discussed in greater detail, the plurality of predefined blocks 540 may have any suitable dimensioning. In some embodiments, each of the predefined blocks 540 define a plurality of external faces and one or more predefined paths for the mobile drive units that extend to at least one of the external faces. In some embodiments, each of the predefined blocks 540 has a rectangular profile, although other regular and irregular profiles of the predefined blocks 540 are also contemplated. In some embodiments, each of the predefined blocks 540 corresponds to one or more fiducial markers, which collectively define the plurality of external faces and/or the one or more predefined paths. In some embodiments, placing the one or more predefined blocks 540 comprises specifying an arrangement (e.g., a position and/or an orientation) of each of the predefined blocks 540.

In some embodiments, the plurality of predefined rules comprise one or more grid rules 520, one or more ordering rules 525, one or more connection rules 530, and one or more equipment placement rules 535. The one or more grid rules 520 define a grid for the structured field. More specifically, the one or more grid rules 520 may define a shape, size, and/or arrangement of the grid entries within the structured field. The one or more grid rules 520 may be based on the particular geometry of the structured field, e.g., received as one or more parameters input to the computing device 505. For example, the one or more grid rules 520 may define the shape, size, and/or arrangement of the grid entries responsive to the boundaries of the structured field and/or one or more irregularities of the structured field. The one or more grid rules 520 may be further based on the dimensioning of the mobile drive units, e.g., to reduce the likelihood of collisions with and/or between the mobile drive units.

The one or more ordering rules 525 define a hierarchy (or other ordering) for placing the different types of the predefined blocks 540. For example, the one or more ordering rules 525 may prescribe an order for placing the predefined blocks 540 of the different function types of the inventory system. In some embodiments, the one or more ordering rules 525 may further prescribe an order for attempting different configurations of a particular function type (e.g., a different block size and/or shape).

In some embodiments, the one or more ordering rules 525 prescribe sequentially placing the inventory station blocks, the travel blocks, the storage blocks, and the charging blocks. For example, once a number of inventory station blocks have been placed, the travel blocks providing connectivity to the inventory station blocks may be placed, and so forth. Other orders of the function types are also contemplated. Further, the one or more ordering rules 525 need not require that all blocks of a particular type are placed in a single instance. In one example, the map generation module 545 may place a first plurality of higher-speed travel blocks ("highway" blocks) to provide connectivity to the inventory station blocks once placed, and may later place a second plurality of highway blocks to provide connectivity to the storage blocks once placed. In another example, the map generation module 545 may place a first plurality of travel blocks (e.g., highway blocks) to provide connectivity to the inventory station blocks once placed, and may later place a second plurality of travel blocks (e.g., highway blocks and/or lower-speed travel blocks) to provide connectivity to the first plurality of travel blocks and/or to other types of the predefined blocks 540. In some cases, the lower-speed travel blocks may be placed to "fill in" vacant grid entries (e.g., the grid entries that do not have any other types of the predefined blocks 540 placed).

The one or more connection rules 530 describe whether (and how) the different types of the predefined blocks 540 may connect to other predefined blocks 540. For example, the one or more connection rules 530 may specify that certain faces of the different types of the predefined blocks 540 may connect, that certain types of the predefined blocks 540 may connect with other types of the predefined blocks 540, and so forth. In another example, the one or more connection rules 530 may specify that certain paths (or types of the paths, directionality of the paths, etc.) of the predefined blocks 540 may connect.

The one or more equipment placement rules 535 describe an arrangement of active equipment that supports the operation of the mobile drive units and/or the inventory system. For example, the one or more equipment placement rules 535 may define location(s), orientation(s), and/or configuration(s) of the active equipment. In some embodiments, the one or more predefined charger blocks comprise active equipment, such as an electrical interface and associated connectivity, that supports selectively charging the plurality of mobile drive units.

The map generation module 545 may generate the maps in any suitable form. In some embodiments, each map comprises location information for fiducial markers corresponding to the predefined blocks 540. In some embodiments, the map generation module 545 generates a plurality of prospective maps that are assessed by the simulation module 550.

In some embodiments, the simulation module 550 simulates a respective throughput for each of the prospective maps, although other suitable measures of efficiency or effectiveness are also contemplated. For example, the simulation module 550 may calculate a number of operations performed (e.g., a number of orders fulfilled, a number of movements of inventory items) within a predefined amount of time, a length of time needed to perform a predefined number of operations, and so forth. In some embodiments, the simulation module 550 applies a predefined scenario (whether historical or hypothetical) that specifies initial positions of the inventory items present in the inventory system, the mobile drive units, and/or other components of the inventory system (e.g., inventory holders 30).

In some embodiments, the computing device 505 outputs a map representing the floor plan of the inventory system. In some embodiments, the output map is the map selected as having the greatest throughput (or other relevant measure). The computing device 505 generates a control signal 560 that configures the unmanned fiducial marker application unit 25 to apply the fiducial markers corresponding to the output map to a floor.

Figure 14:
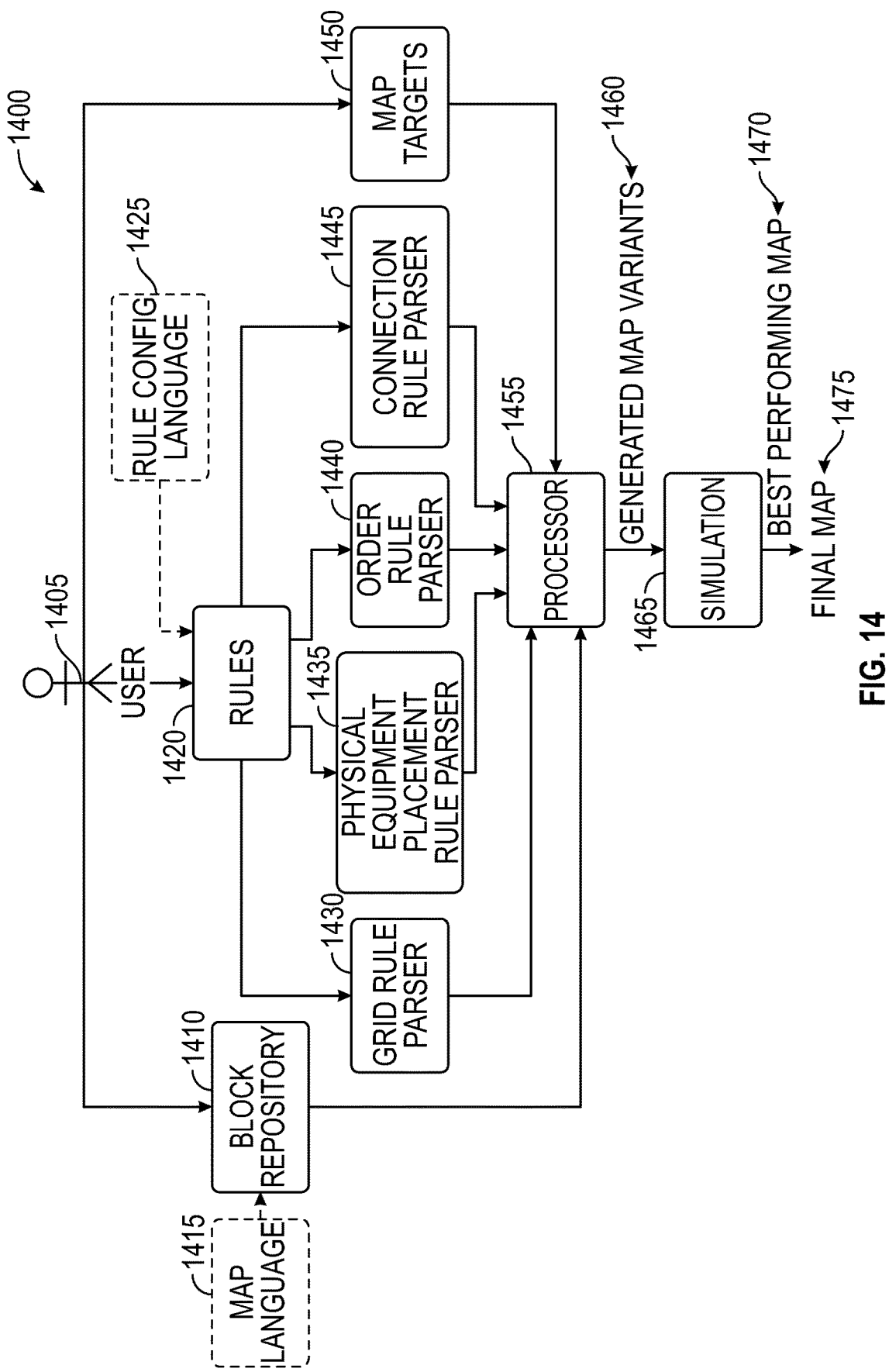
FIG. 14 illustrates a sequence for generating a floor plan, according to one or more embodiments.

In some embodiments, the computing device 505 may perform a sequence for generating a floor plan according to FIG. 14. In diagram 1400, map language 1415 is provided to a block repository 1410. The map language 1415 defines the constructs needed to create various blocks and the associated inputs and outputs. The block repository 1410 is used to store all of the created blocks and each block may be identified by a unique identifier. In some embodiments, a user 1405 provides inputs to the block repository 1410.

Rule configuration language 1425 defines the constructs needed to define the different kinds of rules 1420. In some embodiments, the rules 1420 comprise the grid rule(s) 520, the ordering rule(s) 525, the connection rule(s) 530, and the equipment placement rule(s) 535. In some embodiments, the rules 1420 are specified by the user 1405 to generate a map for a specific solution. In some embodiments, the rules 1420 may be specified from a rule repository and referenced to predefined solution type(s), so that the user 1405 need not specify all of the rules 1420 for each map. For example, the user 1405 may specify using a default set of rules for a particular solution type, or may override one or more of the default rules.

One or more map targets 1450 define various targets for the generated maps. For example, the user 1405 may specify that the structured field (e.g., the floor plan) include 97.5% storage blocks. In this way, some of the prospective maps that are generated may be discarded as not meeting the map target(s) 1450. The map target(s) 1450 may also be used to update the operation of a processor 1455 (e.g., specifying an ordering of block placement).

A plurality of parsers may be used to parse relevant rules from the rules 1420 for performing the map generation. In some embodiments, the plurality of parsers includes a grid rule parser 1430, a physical equipment placement rule parser 1435, an order rule parser 1440, and a connection rule parser 1445.

The processor 1455 receives the blocks from the block repository 1410, the parsed rules received from the plurality of parsers, and the map target(s) 1450, and generates a plurality of generated map variants 1460. The grid rules allow the processor 1455 to generate a grid for the structured field, and each grid location may be designated as capable of having a fiducial or not. The generated map may be completed once the designation is made for each grid location.

In some embodiments, all physical equipment block(s) are first placed by the processor 1455 according to the equipment placement rule(s) 535. Next, all placed blocks that are not fully connected are selected. For the selected blocks, each unconnected face may be selected and compatible block types identified, and the processor 1455 attempts to connect with the compatible block types according to the ordering rule(s) 525. When each block is placed, the already-placed blocks may be assessed according to the connection rule(s) 530 to determine that each connection is valid.

Certain locations within the structured field may have physical obstructions (e.g., pillars). In some embodiments, when a block is placed and intersects a physical obstruction, the block may be modified according to one or more block configuration rules. For example, one or more of the fiducial markers of the predefined block may be removed to accommodate the physical obstruction. The modified block may be stored as a new block type.

The generated map variants 1460 are assessed through a simulation 1465 to determine a best performing map 1470 as a final map 1475 for the structured field.

Figure 6:
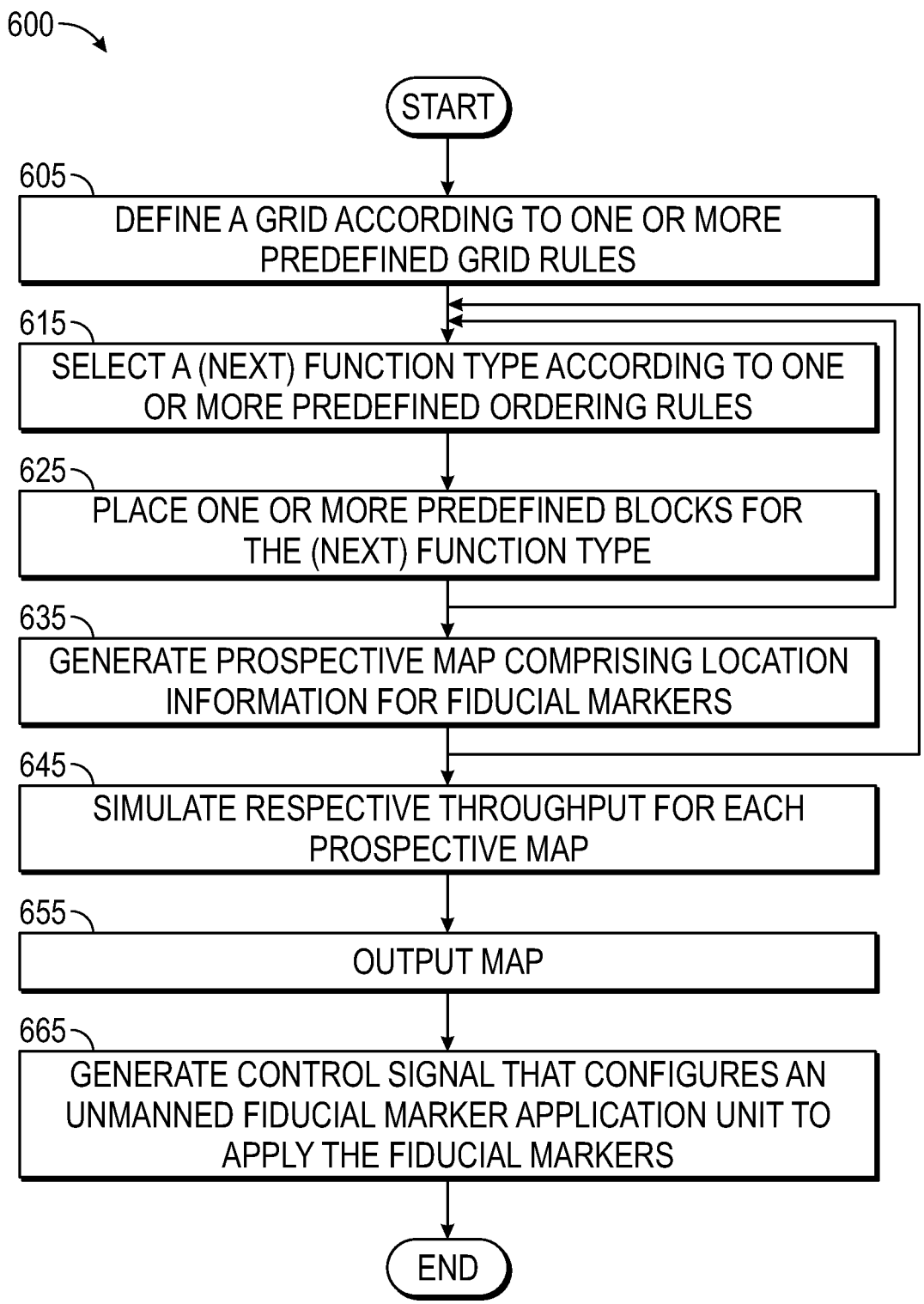
FIG. 6 is a method of generating a map from a plurality of prospective maps, according to one or more embodiments.

FIG. 6 is a method 600 of generating a map from a plurality of prospective maps, according to one or more embodiments. The method 600 may be used in conjunction with other embodiments. For example, the method 600 may be performed using the computing device 505 of FIG. 5.

The method 600 begins at block 605, where a grid is defined according to one or more predefined grid rules. In some embodiments, the one or more grid rules define a shape, size, and/or arrangement of the grid entries within the structured field. The one or more grid rules may be based on the geometry of the structured field and/or the dimensioning of the mobile drive units.

At block 615, a function type is selected according to one or more predefined ordering rules. At block 625, one or more predefined blocks are placed for the function type. In some embodiments, the method 600 may return to block 615 and a next function type is selected according to the one or more predefined ordering rules. At block 625, one or more predefined blocks are placed for the next function type. The blocks 615, 625 may be repeated until each of the function types specified by the one or more predefined ordering rules have been selected.

At block 635, a prospective map is generated comprising location information for fiducial markers corresponding to the predefined blocks that were placed in block 625. In some embodiments, the method 600 may return to block 615 and blocks 615, 625 repeated to generate one or more additional prospective maps.

At block 645, a respective throughput is simulated for each prospective map. At block 655, a map is output, which in some cases corresponds to the prospective map having the greatest throughput. At block 665, a control signal is generated that configures an unmanned fiducial marker application unit to apply the fiducial markers. The method 600 ends following completion of the block 665.

Figure 7:
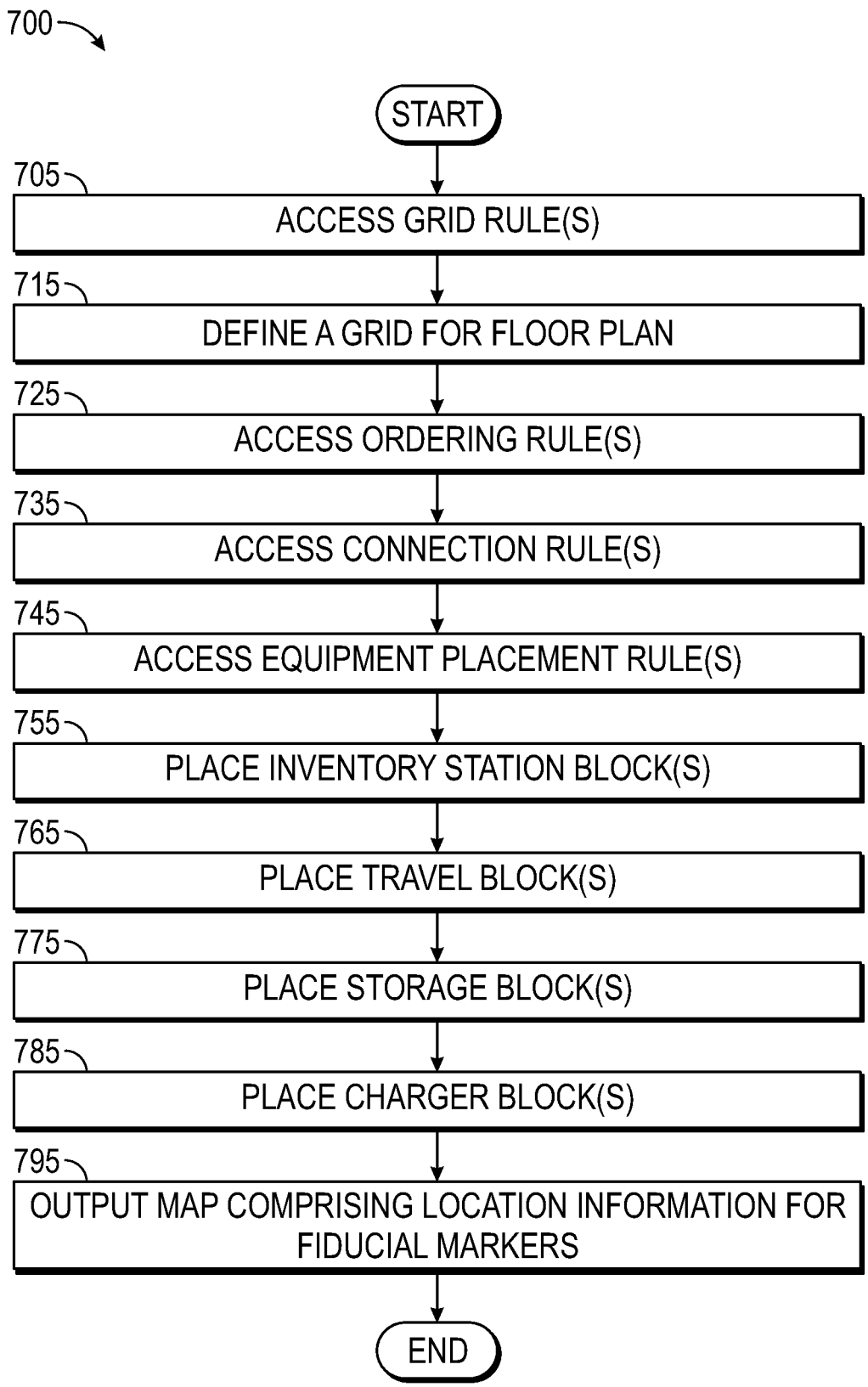
FIG. 7 is a method of generating a floor plan for use by a plurality of mobile drive units within an inventory system, according to one or more embodiments.

FIG. 7 is a method 700 of generating a floor plan for use by a plurality of mobile drive units within an inventory system, according to one or more embodiments. The method 700 may be used in conjunction with other embodiments. For example, the method 700 may represent one specific implementation of the method 600 of FIG. 6.

The method 700 begins at block 705, where one or more predefined grid rules are accessed. At block 715, a grid is defined for the floor plan using the one or more predefined grid rules. At block 725, one or more ordering rules are accessed. At block 735, one or more connection rules are accessed. At block 745, one or more equipment placement rules are accessed.

At block 755, one or more inventory station blocks are placed. At block 765, one or more travel blocks are placed. At block 775, one or more storage blocks are placed. At block 785, one or more charger blocks are placed. In some embodiments, the blocks 755, 765, 775, 785 are performed according to the one or more ordering rules. In some embodiments, the travel block(s), storage block(s), and/or charger block(s) are placed by specifying an orientation of the particular block(s) to connect respective faces of the block(s) according to the one or more connection rules.

At block 795, a map is output comprising location information for fiducial markers corresponding to the travel block(s), storage block(s), and/or charger block(s) that were respectively placed in the blocks 765, 776, 785. The method 700 ends following completion of the block 795.

Figure 8B:
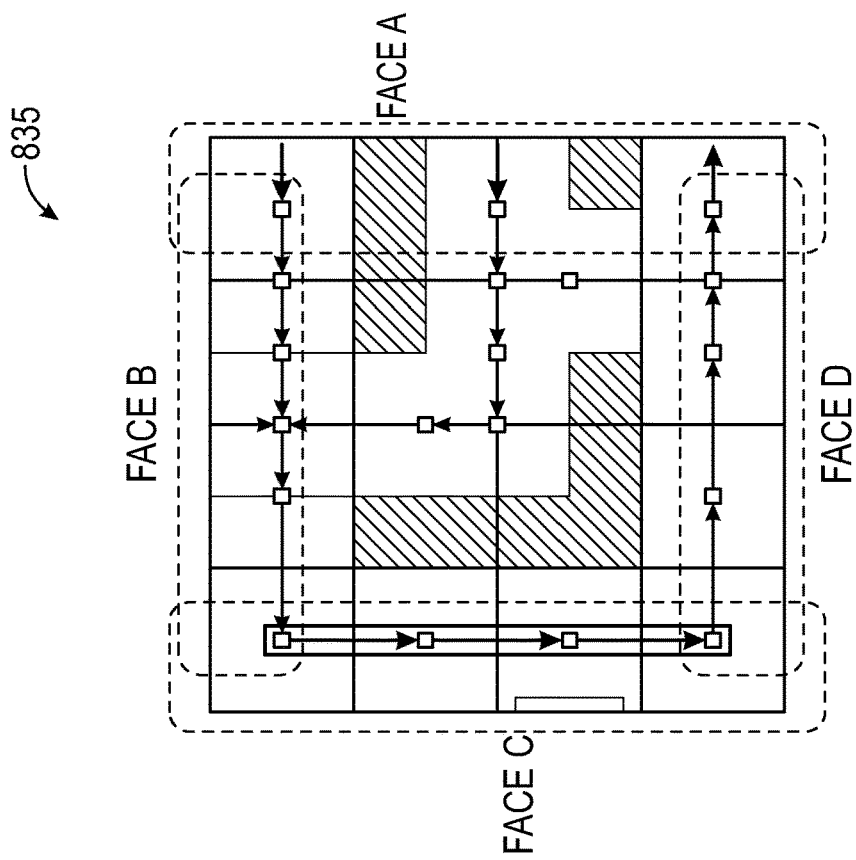
FIG. 8B is an exemplary inventory station block with a ninety-degree orientation, according to one or more embodiments.
Figure 8A:
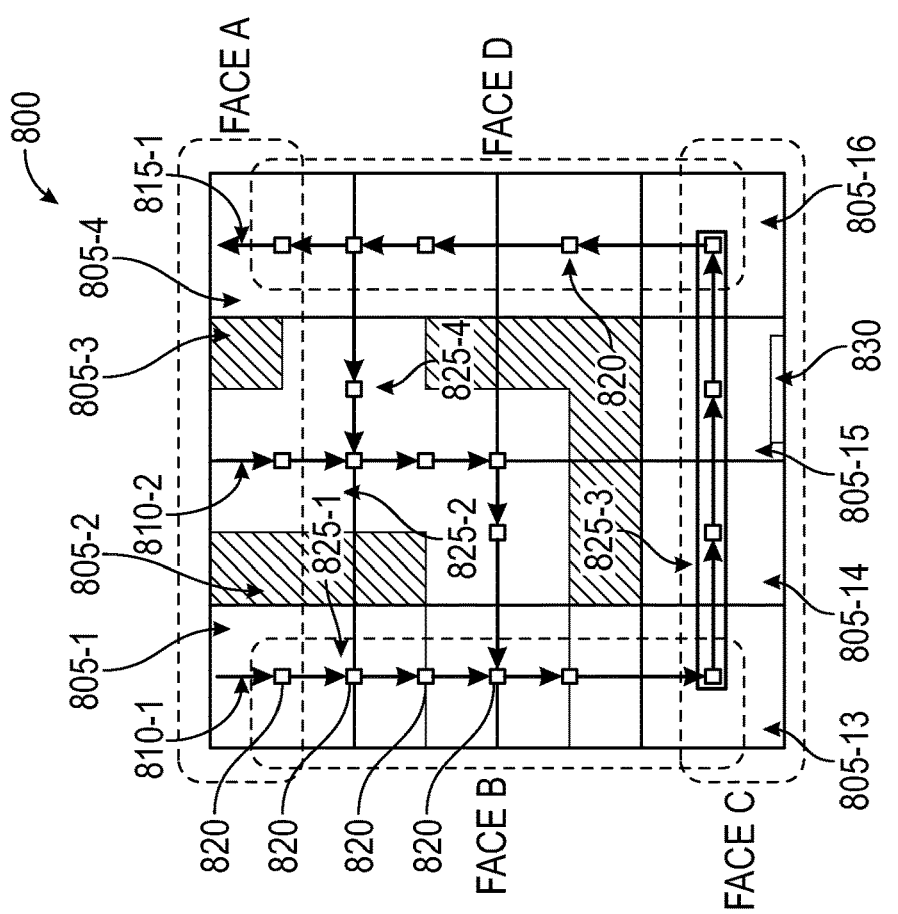
FIG. 8A is an exemplary inventory station block with a zero orientation, according to one or more embodiments.

FIG. 8A is a diagram 800 depicting an exemplary inventory station block with a zero orientation, according to one or more embodiments. FIG. 8B is a diagram 835 depicting the inventory station block with a ninety (90)-degree orientation. The features depicted in the diagrams 800, 835 may be used in conjunction with other embodiments described herein.

As shown, the inventory station block comprises grid entries 805-1, 805-2, 805-3, 805-4, ..., 805-13, 805-14, 805-15, 805-16 arranged as a 4×4 grid. The inventory station block defines a plurality of faces: Face A is defined across the grid entries 805-1, 805-2, 805-3, 805-4, Face B is defined across the grid entries 805-1, 805-5, 805-9, 805-13, Face C is defined across the grid entries 805-13, 805-14, 805-15, 805-16, and Face D is defined across the grid entries 805-4, 805-8, 805-12, 805-16.

The inventory station block defines two inputs 810-1, 810-2 and an output 815-1 at Face A. The inventory station block defines an inventory station 830 at Face C, and more specifically at the grid entry 805-15. The input 810-1 is connected to a first branch 825-1 and the input 810-2 is connected to a second branch 825-2 that define paths along which mobile drive units may travel. The first branch 825-1 extends from the input 810-1 along a vertical midline of the grid entries 805-1, 805-5, 805-9, 805-13. The second branch 825-2 extends from the input 810-2 along a vertical line between the grid entries 805-2, 805-3 and between the grid entries 805-6, 805-7. The second branch 825-2 then extends toward Face B along a horizontal line between the grid entries 805-6, 805-10 and intersects the first branch 825-1 between the grid entries 805-5, 805-9. In this way, the first branch 825-1 and second branch 825-2 provide redundant paths for incoming mobile drive units, and may also support queueing or other sequencing of the mobile drive units onto a third branch 825-3 that passes the inventory station 830.

The third branch 825-3 extends from the intersection toward Face C along the vertical midline of the grid entries 805-9, 805-13, extends toward Face D along the horizontal midline of the grid entries 805-13, 805-14, 805-14, 805-16. After passing the inventory station 830, the third branch 825-3 turns toward Face A at the grid entry 805-16, extending along the vertical midline of the grid entries 805-16, 805-12, 805-8, 805-4 to the output 815-1 at Face A. A fourth branch 825-4 extends from the third branch 825-3 to the second branch 825-2 along a horizontal line between the grid entries 805-4, 805-8 and between the grid entries 805-3, 805-7. In some cases, the fourth branch 825-4 may be selectively enabled to prevent mobile drive units from exiting the inventory station block at the output 815-1, instead directing the mobile drive units toward the third branch 825-3. A plurality of fiducial markers 820 are used to identify the inputs 810-1, 810-2, the first branch 825-1, the second branch 825-2, the third branch 825-3, the fourth branch 825-4, and the output 815-1 for controlling the movement of the mobile drive units through the inventory station block.

The inventory station block has a zero orientation in the diagram 800, such that Face A is arranged in a "north" position. In the diagram 835, the inventory station block has a 90-degree orientation, such that Face A is arranged in an "east" position.

In some embodiments, the one or more connection rules specify that Face A of the inventory station block may connect only with a highway block, while Face B, Face C, and Face D are not permitted to connect with other predefined blocks.

FIG. 9 is a diagram 900 depicting an alternate implementation of an inventory station block, according to one or more embodiments. More specifically, the inventory station block comprises grid entries 805-1, 805-2, 805-3, 805-4, 805-5, . . . , 805-16, 805-17, 805-18, 805-19, 805-20 arranged as a 4×5 grid. Notably, the inventory station block of FIG. 9 differs from the inventory of FIG. 8A as the first branch 825-1 extends from the input 810-1 along a vertical midline of the grid entries 805-1, 805-6, 805-11, 805-16. The second branch 825-2 extends from the input 810-2 along a vertical midline of the grid entries 805-3, 805-8, then extends toward Face B along a horizontal line between the grid entries 805-8, 805-13 and between the grid entries 805-7, 805-12 and intersects the first branch 825-1 between the grid entries 805-6, 805-11.

The third branch 825-3 extends from the intersection toward Face C along the vertical midline of the grid entries 805-11, 805-16, extends toward Face D along the horizontal midline of the grid entries 805-16, 805-17, 805-18, 805-19, 805-20. After passing the inventory station 830, the third branch 825-3 turns toward Face A at the grid entry 805-20, extending along the vertical midline of the grid entries 805-20, 805-15, 805-10, 805-5 to the output 815-1 at Face A. A fourth branch 825-4 extends from the third branch 825-3 to the second branch 825-2 along a horizontal line between the grid entries 805-5, 805-10, between the grid entries 805-4, 805-9, and between the grid entries 805-3, 805-8.

FIG. 10 is a diagram 1000 depicting an exemplary highway block, according to one or more embodiments. The highway block is arranged as a 4×5 grid. The highway block represents a higher-speed travel block providing one or more dedicated travel paths for the mobile drive units. The highway block provides four lanes extending in an east-west direction (between Face B and Face D) and four columns extending in a north-south direction (between Face A and Face C). Face A includes a plurality of input/outputs 1005-1, 1005-2, 1005-3, 1005-4 and an output 1010. The input/outputs 1005-1, 1005-2 connect to respective columns 1050-1, 1050-2 extending from Face C to Face A, and the input/outputs 1005-3, 1005-4 connect to respective columns 1050-3, 1050-4 extending from Face A to Face C. The output 1010 connects to a north-south path extending between Face A and Face C.

Face B includes two inputs 1015-1, 1015-2 that respectively connect to lanes 1045-1, 1045-2 extending from west to east (Face B to Face D), and two outputs 1020-1, 1020-2 that respectively connect to lanes 1045-3, 1045-4 extending from east to west (Face D to Face B). Face C includes one input 1025 that connects to a column 1050-1 extending south to north (Face C to Face A), and two outputs 1030-1, 1030-2. The output 1030-2 connects to a column 1050-4 extending north to south (Face A to Face C). The output 1030-1 connects to a north-south path between the columns 1050-1, 1050-2 and the columns 1050-3, 1050-4. Face D includes two inputs 1035-1, 1035-2 respectively connecting to the lanes 1045-4, 1045-3, and two outputs 1040-1, 1040-2 respectively connecting to the lanes 1045-2, 1045-1.

In some embodiments, the one or more connection rules specify that Face B and Face D of the highway block may connect only with other highway blocks, while Face A and Face C of the highway block are permitted to connect with other types of predefined blocks, such as lower-speed travel blocks, storage blocks, and so forth.

Figure 11:
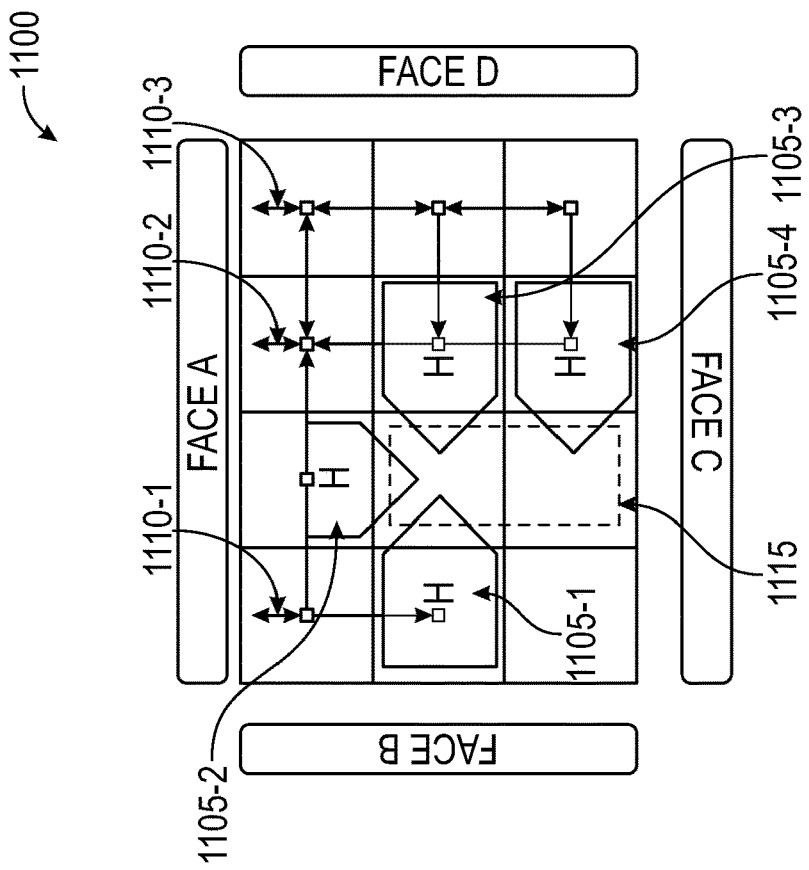
FIG. 11 is an exemplary charger block, according to one or more embodiments.
Figure 13A:
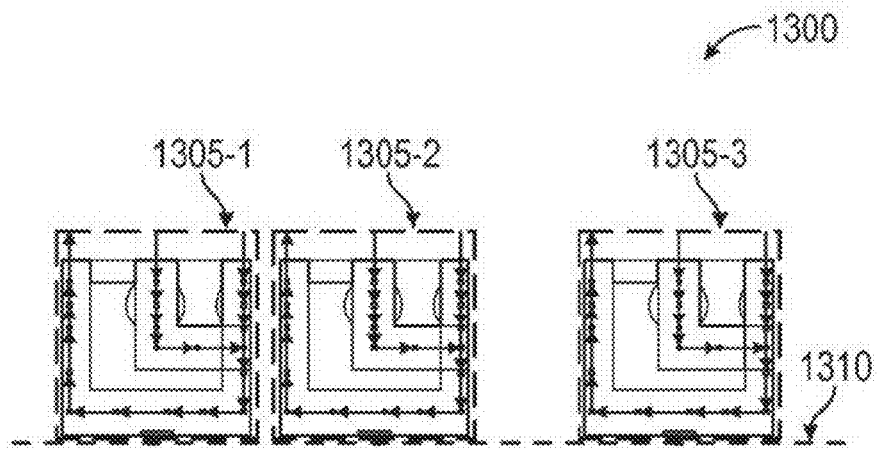
FIGS. 13A, 13B, 13C, and 13D provide an exemplary sequence of generating a floor plan for use by a plurality of mobile drive units within an inventory system, according to one or more embodiments.
Figure 13B:
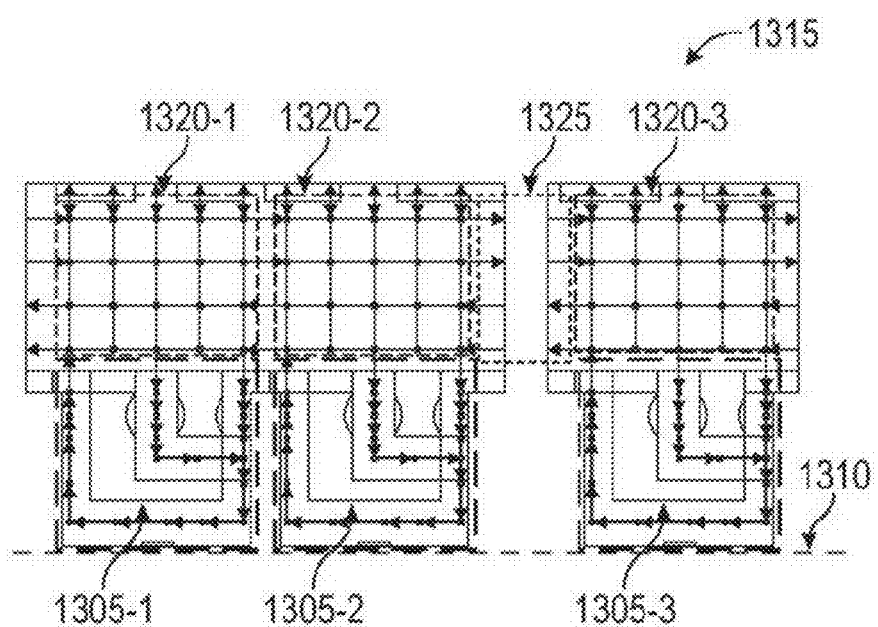
Figure 13C:
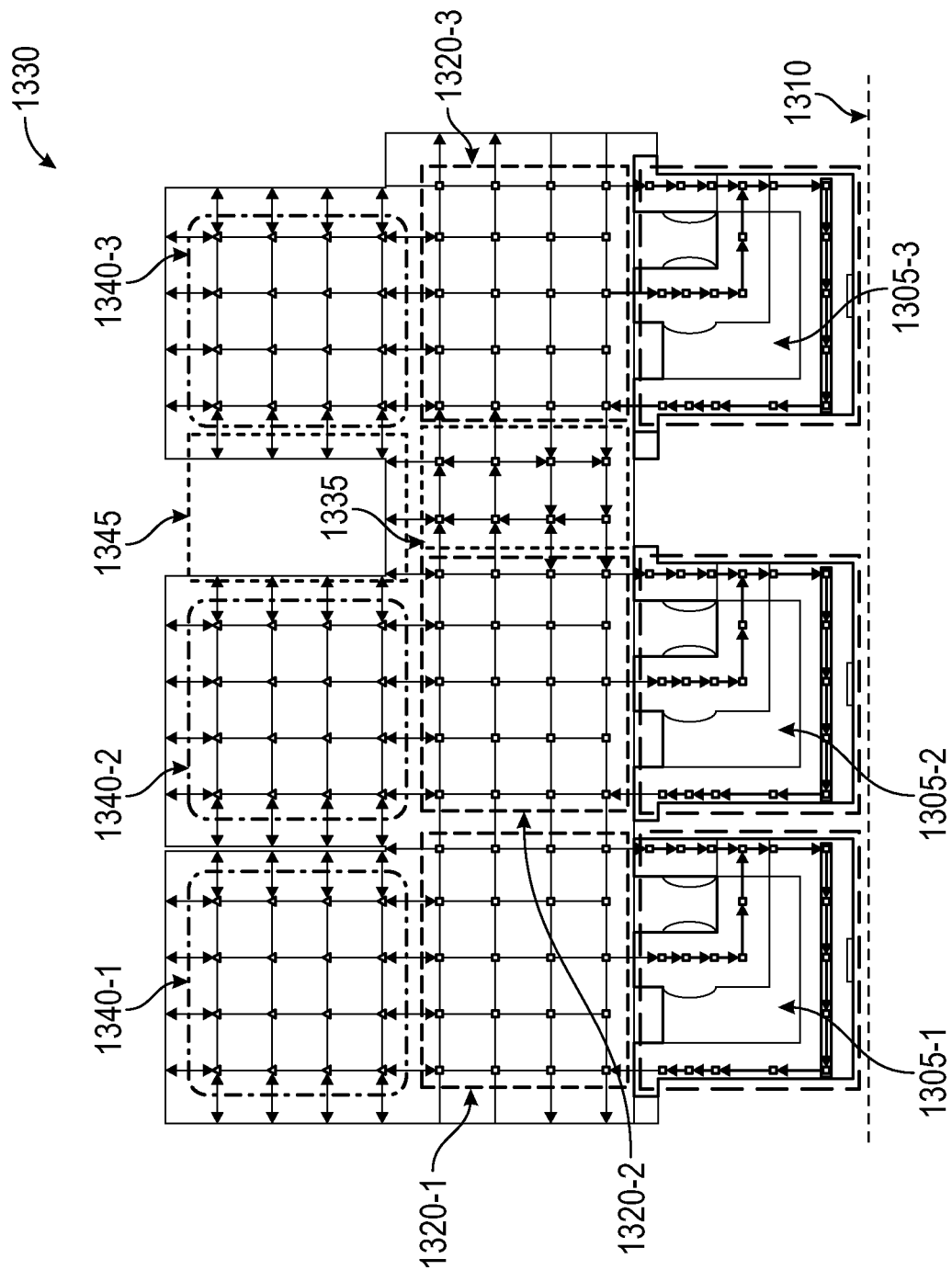
Figure 13D:
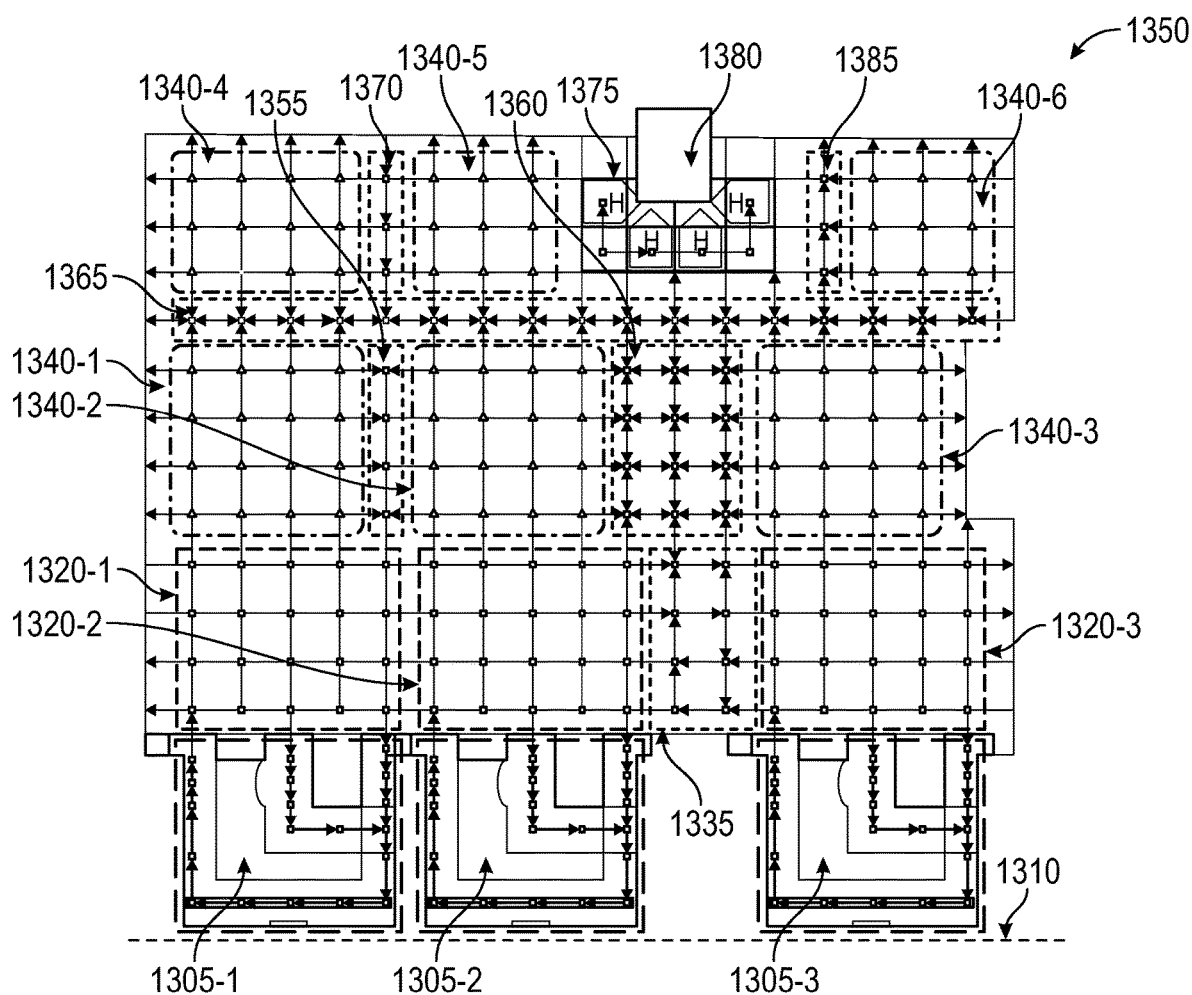

FIG. 11 is a diagram 1100 depicting an exemplary charger block, according to one or more embodiments. The charger block is arranged as a 3×4 grid and includes four (4) chargers 1105-1, 1105-2, 1105-3, 1105-4 at which the mobile drive units may park and receive electrical charge. Face A includes input/outputs 1110-1, 1110-2, 1110-3. A power panel 1115 (one example of active equipment supporting the operation of the mobile drive units) connects to the chargers 1105-1, 1105-2, 1105-3, 1105-4.

In some embodiments, the one or more connection rules specify that Face A of the charger block may connect only with travel blocks, while Face B, Face C, and Face D of the charger block are not permitted to connect with other predefined blocks.

Figure 12:
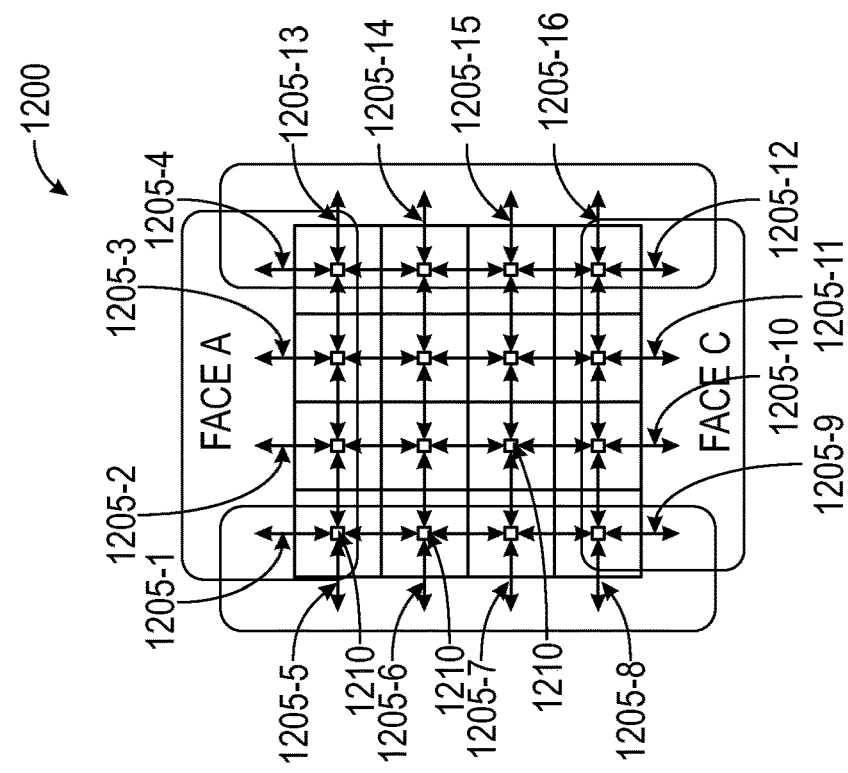
FIG. 12 is an exemplary storage block, according to one or more embodiments.

FIG. 12 is a diagram 1200 depicting an exemplary storage block, according to one or more embodiments. The storage block is arranged as a 4×4 grid and includes sixteen (16) storage locations 1210. Face A includes input/outputs 1205-1, 1205-2, 1205-3, 1205-4. Face B includes input/outputs 1205-5, 1205-6, 1205-7, 1205-8. Face C includes input/outputs 1205-9, 1205-10, 1205-11, 1205-12. Face D includes input/outputs 1205-13, 1205-14, 1205-15, 1205-16.

In some embodiments, the one or more connection rules specify that Face A, Face B, Face C, and Face D of the storage block may connect with any other types of predefined blocks.

FIGS. 13A, 13B, 13C, and 13D provide an exemplary sequence of generating a floor plan for use by a plurality of mobile drive units within an inventory system, according to one or more embodiments. The features illustrated in FIGS. 13A, 13B, 13C, 13D may be used in conjunction with other embodiments.

Diagram 1300 depicts a portion of a structured field near an outer boundary 1310 of the structured field. After a grid has been defined for the structured field, three (3) inventory station blocks 1305-1, 1305-2, 1305-3 are placed at the outer boundary 1310 according to one or more predefined ordering rules.

In diagram 1315, three (3) highway blocks 1320-1, 1320-2, 1320-3 are connected with the respective inventory station blocks 1305-1, 1305-2, 1305-3 according to one or more predefined connection rules. In some embodiments, placing the highway blocks 1320-1, 1320-2, 1320-3 comprises specifying an orientation of the highway blocks 1320-1, 1320-2, 1320-3 such that a respective first face of the highway block 1320-1, 1320-2, 1320-3 (e.g., Face C of the highway blocks 1320-1, 1320-2, 1320-3) connects to a respective second face of a respective inventory station block 1305-1, 1305-2, 1305-3 (e.g., Face A of the inventory station blocks 1305-1, 1305-2, 1305-3). An opening 1325 between the highway blocks 1320-2, 1320-3 is differently sized than the highway blocks 1320-1, 1320-2, 1320-3.

In diagram 1330, a highway block 1335 is placed between the highway blocks 1320-2, 1320-3. Three (3) storage blocks 1340-1, 1340-2, 1340-3 are connected with the respective highway blocks 1320-1, 1320-2, 1320-3 according to the one or more predefined connection rules. An opening 1345 between the highway blocks 1340-2, 1340-3 is differently sized than the storage blocks 1340-1, 1340-2, 1340-3.

In diagram 1350, three (3) additional storage blocks 1340-4, 1340-5, 1340-6 and a charger block 1375 are placed in an arrangement that is spaced apart from the storage blocks 1340-1, 1340-2, 1340-3. A power panel 1380 connects to the chargers of the charger block 1375. A travel block 1355 is placed between the storage blocks 1340-1, 1340-2, and a travel block 1360 is placed between the storage blocks 1340-2, 1340-3.

A travel block 1370 is placed between the storage blocks 1340-4, 1340-5, and a travel block 1385 is placed between the charger block 1375 and the storage block 1340-6. A travel block 1365 is placed between (i) the storage blocks 1340-1, 1340-2, 1340-3 and the travel blocks 1355, 1360 and (ii) the storage blocks 1340-4, 1340-5, 1340-6, the travel block 1370, the charger block 1375, and the travel block 1385.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions, While the foregoing is directed to embodiments of the present invention, other and further embodiments of the invention may be devised without departing from the basic scope thereof, and the scope thereof is determined by the claims that follow.

What is claimed is:

1. A method, comprising:
  generating, by one or more processors, a floor plan for use by a plurality of mobile drive units within an inventory system, the floor plan being generated based at least in part on:
  (a) defining, by the one or more processors, a grid for the floor plan according to one or more predefined grid rules;
  (b) specifying, by the one or more processors, at first locations within the grid, one or more predefined inventory station blocks corresponding to one or more inventory stations at which the inventory system is externally accessible;
  (c) specifying, by the one or more processors, at second locations within the grid, one or more predefined travel blocks defining one or more dedicated travel paths for the plurality of mobile drive units, wherein one or more predefined connection rules specify one or more faces of the one or more predefined inventory station blocks that are permitted to connect with one or more faces of the one or more predefined travel blocks, wherein placing the one or more predefined travel blocks comprises specifying, for each travel block of the one or more predefined travel blocks, an orientation of the travel block such that a respective first face of the travel block connects to a respective second face of a respective inventory station block of the one or more predefined inventory station blocks;
  (d) specifying, by the one or more processors, at third locations within the grid, one or more predefined storage blocks for storing inventory holders that are selectively movable by the plurality of mobile drive units, wherein the one or more predefined connection rules further specify one or more faces of the one or more predefined inventory station blocks that are permitted to connect with one or more faces of the one or more predefined travel blocks; and (e) generating, by the one or more processors, a map representing the floor plan, wherein the map comprises location information for fiducial markers corresponding to the one or more predefined inventory station blocks, the one or more predefined travel blocks, and the one or more predefined storage blocks; and controlling, by the one or more processors, an unmanned mobile drive unit to apply the fiducial markers to a floor according to the floor plan.

2. The method of claim 1, wherein method further comprises:

generating, by the one or more processors, a control signal that, when received by an unmanned fiducial marker application unit of the unmanned mobile drive unit, causes the unmanned fiducial marker application unit of the unmanned mobile drive unit to apply the fiducial markers to the floor.

3. The method of claim 1, further comprising:

specifying, by the one or more processors at fourth locations within the grid, one or more predefined charger blocks for selectively charging the plurality of mobile drive units, wherein the one or more predefined connection rules further specify one or more faces of the one or more predefined charger blocks that are permitted to connect with one or more faces of the one or more predefined travel blocks, wherein the map further comprises location information for the one or more predefined charger blocks.

4. The method of claim 3, wherein the one or more predefined charger blocks comprise active equipment that supports selectively charging the plurality of mobile drive units, and wherein specifying, by the one or more processors, the one or more predefined charger blocks comprises applying one or more predefined equipment placement rules.

5. The method of claim 1, wherein at least (b)-(d) are performed in a first iteration to generate a first prospective map, the method further comprising:

performing at least (b)-(d) in one or more additional iterations to generate one or more additional prospective maps;

simulating, by the one or more processors, a respective throughput for each of the one or more additional prospective maps; and outputting, by the one or more processors and as the map, a prospective map having a greatest throughput.

6. The method of claim 5, wherein simulating the respective throughput for each of the one or more prospective maps comprises:

executing, by the one or more processors using the floor plan, a first simulation with initial positions of inventory items within the inventory system and initial locations of a set of mobile drive units;

executing, by the one or more processors using a particular prospective map of the one or more additional prospective maps, a second simulation with the initial positions of inventory items within the inventory system and the initial locations of the set of mobile drive units;

determining, by the one or more processors, a first throughput corresponding to the first simulation and a second throughput corresponding to the second simulation, wherein controlling the unmanned mobile drive unit is in response to determining that the first throughput exceeds the second throughput.

7. A system of generating a floor plan for use by a plurality of mobile drive units within an inventory system, the system comprising:

a memory storing one or more predefined grid rules, one or more predefined ordering rules, and one or more predefined connection rules; and one or more computer processors configured to:
generate the floor plan based at least in part on:
(a) define a grid for the floor plan according to the one or more predefined grid rules;
(b) select a first function type of the inventory system according to the one or more predefined ordering rules;
(c) specify, at first locations within the grid, one or more predefined first blocks for the first function type, wherein placing the one or more predefined first blocks comprises specifying an orientation of a respective first face of each first block of the one or more predefined first blocks;
(d) select, based on the first function type, a second function type of the inventory system according to the one or more predefined ordering rules; and
(e) specify, at second locations within the grid that are adjacent to the second locations of the one or more predefined first blocks, one or more predefined second blocks for the second function type, wherein placing the one or more predefined second blocks comprises specifying, for each second block of the one or more predefined second blocks, a respective orientation of a respective second face of the second block to connect to the respective first face according to the one or more predefined connection rules; and
(f) generate a map representing the floor plan, wherein the map comprises location information for fiducial markers corresponding to the one or more predefined first blocks and the one or more predefined second blocks; and control an unmanned mobile drive unit of the plurality of mobile drive units to apply the fiducial markers to a floor according to the floor plan.

8. The system of claim 7, wherein the one or more computer processors are further configured to generate a control signal that, when received by an unmanned fiducial marker application unit of the unmanned mobile drive unit, causes the unmanned fiducial marker application unit of the unmanned mobile drive unit to apply the fiducial markers to the floor.

9. The system of claim 7, wherein the one or more computer processors are further configured to:

specify, at fourth locations within the grid, one or more predefined charger blocks for selectively charging the plurality of mobile drive units, wherein the one or more predefined connection rules further specify one or more faces of the one or more predefined charger blocks that are permitted to connect with one or more faces of one or more predefined travel blocks defining one or more dedicated travel paths for the plurality of mobile drive units, wherein the map further comprises location information for the one or more predefined charger blocks.

10. The system of claim 9, wherein the memory further stores one or more predefined equipment placement rules, wherein the one or more predefined charger blocks comprise active equipment that supports selectively charging the plurality of mobile drive units, and wherein specifying the one or more predefined charger blocks comprises applying the one or more predefined equipment placement rules.

11. The system of claim 7, wherein at least (b)-(e) are performed in a first iteration to generate a first prospective map, wherein the one or more computer processors are further configured to:

perform at least (b)-(e) in one or more additional iterations to generate one or more additional prospective maps;

simulate a respective throughput for each of the one or more additional prospective maps; and output, as the map, a prospective map having a greatest throughput.

12. The system of claim 7, wherein the one or more predefined first blocks comprise one or more predefined inventory station blocks corresponding to one or more inventory stations at which the inventory system is externally accessible, and wherein the one or more predefined second blocks comprises one or more predefined travel blocks defining one or more dedicated travel paths for the plurality of mobile drive units.

13. The system of claim 12, wherein the one or more computer processors are further configured to:

specify, at third locations within the grid, one or more predefined storage blocks for storing inventory holders that are selectively movable by the plurality of mobile drive units.

14. A computer-implemented method, comprising:

generating, by one or more processors, a floor plan for use by a plurality of mobile drive units within an inventory system, the floor plan being generated based at least in part on:

(a) defining, by the one or more processors, a grid for the floor plan according to one or more predefined grid rules;

(b) selecting, by the one or more processors, a first function type of the inventory system according to one or more predefined ordering rules;

(c) placing, by the one or more processors, at first respective locations within the grid, one or more predefined first blocks for the first function type, wherein placing the one or more predefined first blocks comprises specifying an orientation of a respective first face of each first block of the one or more predefined first blocks;

(d) selecting, by the one or more processors based on the first function type, a second function type of the inventory system according to the one or more predefined ordering rules;

(e) placing, by the one or more processors at second respective locations within the grid that are adjacent to the first respective locations of the one or more predefined first blocks, one or more predefined second blocks for the second function type, wherein placing the one or more predefined second blocks comprises specifying, for each second block of the one or more predefined second blocks, a respective orientation of a respective second face of the second block to connect to the respective first face according to one or more predefined connection rules; and (f) outputting, by the one or more processors, a map representing the floor plan, wherein the map comprises location information for fiducial markers corresponding to the one or more predefined first blocks and the one or more predefined second blocks; and controlling, by the one or more processors, an unmanned mobile drive unit to apply the fiducial markers to a floor according to the floor plan.

15. The method of claim 14, wherein outputting the map comprises:

generating a control signal that, when received by an unmanned fiducial marker application unit of the unmanned mobile drive unit, causes the unmanned fiducial marker application unit of the unmanned mobile drive unit to apply the fiducial markers to the floor.

16. The method of claim 14, further comprising:

placing, at third respective locations within the grid, one or more predefined charger blocks for selectively charging the plurality of mobile drive units, wherein the one or more predefined connection rules further specify one or more faces of the one or more predefined charger blocks that are permitted to connect with one or more faces of one or more predefined travel blocks defining one or more dedicated travel paths for the plurality of mobile drive units, wherein the map further comprises location information for the one or more predefined charger blocks.

17. The method of claim 16, wherein the one or more predefined charger blocks comprise active equipment that supports selectively charging the plurality of mobile drive units, and wherein placing the one or more predefined charger blocks comprises applying one or more predefined equipment placement rules.

18. The method of claim 14, wherein at least (b)-(e) are performed in a first iteration to generate a first prospective map, the method further comprising:

performing at least (b)-(e) in one or more additional iterations to generate one or more additional prospective maps;

simulating a respective throughput for each of the one or more additional prospective maps; and outputting, as the map, a prospective map having a greatest throughput.

19. The method of claim 14, wherein the one or more predefined first blocks comprise one or more predefined inventory station blocks corresponding to one or more inventory stations at which the inventory system is externally accessible, and wherein the one or more predefined second blocks comprises one or more predefined travel blocks defining one or more dedicated travel paths for the plurality of mobile drive units.

20. The method of claim 19, further comprising:

placing, at third locations within the grid, one or more predefined storage blocks for storing inventory holders that are selectively movable by the plurality of mobile drive units.

\* \* \* \* \*